US012725592B2

(12) United States Patent
Ekstrand et al.

(10) Patent No.: US 12,725,592 B2
(45) Date of Patent: *Sep. 1, 2026

(54) EFFICIENT COMBINED HARMONIC TRANSPOSITION

(71) Applicant: DOLBY INTERNATIONAL AB, Dublin (IE)

(72) Inventors: Per Ekstrand, Saltsjobaden (SE); Lars Villemoes, Järfälla (SE); Per Hedelin, Gothenburg (SE)

(73) Assignee: DOLBY INTERNATIONAL AB, Dublin (IE)

( * ) Notice: Subject to any disclaimer, the term of this patent is extended or adjusted under 35 U.S.C. 154(b) by 149 days.

This patent is subject to a terminal disclaimer.

(21) Appl. No.: 18/912,309

(22) Filed: Oct. 10, 2024

(65) Prior Publication Data

US 2025/0037688 A1 Jan. 30, 2025

Related U.S. Application Data

(63) Continuation of application No. 18/439,478, filed on Feb. 12, 2024, now Pat. No. 12,142,251, which is a (Continued)

(51) Int. Cl.

*G10L 21/038* (2013.01)

*G10H 1/00* (2006.01)

(Continued)

(52) U.S. Cl.

CPC ........... *G10H 1/0091* (2013.01); *G10H 1/125* (2013.01); *G10L 19/265* (2013.01);

(Continued)

(58) Field of Classification Search

CPC ........ G10H 1/0091; G10H 1/043; G10H 1/00; G10H 1/125; G10H 1/12; G10H 2210/311;

(Continued)

(56) References Cited

U.S. PATENT DOCUMENTS 4,790,016 A 12/1988 Mazor et al.
4,914,701 A 4/1990 Zibman (Continued)

FOREIGN PATENT DOCUMENTS

EP 1 374 399 A1 1/2004
JP 2004-514180 A 5/2004

(Continued)

OTHER PUBLICATIONS

Nagel, et al. "A Harmonic Bandwidth Extension Method for Audio Codecs" International Conference on Acoustics, Speech and Signal Processing 2009, Taipei, Apr. 19, 2009, pp. 145-148.

*Primary Examiner* — Huyen X Vo

(57) ABSTRACT

The present document relates to audio coding systems which make use of a harmonic transposition method for high frequency reconstruction (HFR), and to digital effect processors, e.g. so-called exciters, where generation of harmonic distortion adds brightness to the processed signal. In particular, a system configured to generate a high frequency component of a signal from a low frequency component of the signal is described. The system may comprise an analysis filter bank (501) configured to provide a set of analysis subband signals from the low frequency component of the signal; wherein the set of analysis subband signals comprises at least two analysis subband signals; wherein the analysis filter bank (501) has a frequency resolution of Δf. The system further comprises a nonlinear processing unit (502) configured to determine a set of synthesis subband signals from the set of analysis subband signals using a transposition order P; wherein the set of synthesis subband signals comprises a portion of the set of analysis subband signals phase shifted by an amount derived from the transposition order P; and a synthesis filter bank (504) configured to generate the high frequency component of the signal from the set of synthesis subband signals; wherein the synthesis (Continued)

filter bank (504) has a frequency resolution of FΔf; with F being a resolution factor, with F≥1; wherein the transposition order P is different from the resolution factor F.

5 Claims, 14 Drawing Sheets

Related U.S. Application Data continuation of application No. 18/194,414, filed on Mar. 31, 2023, now Pat. No. 11,935,508, which is a continuation of application No. 17/549,661, filed on Dec. 13, 2021, now Pat. No. 11,657,788, which is a continuation of application No. 16/876,793, filed on May 18, 2020, now Pat. No. 11,200,874, which is a continuation of application No. 16/376,433, filed on Apr. 5, 2019, now Pat. No. 10,657,937, which is a continuation of application No. 15/849,915, filed on Dec. 21, 2017, now Pat. No. 10,304,431, which is a continuation of application No. 14/882,559, filed on Oct. 14, 2015, now Pat. No. 9,881,597, which is a continuation of application No. 14/614,172, filed on Feb. 4, 2015, now Pat. No. 9,190,067, which is a continuation of application No. 13/321,910, filed as application No. PCT/EP2010/057176 on May 25, 2010, now Pat. No. 8,983,852.

(60) Provisional application No. 61/312,107, filed on Mar. 9, 2010, provisional application No. 61/181,364, filed on May 27, 2009.

(51) Int. Cl.

| | |
|---|---|
| ***G10H 1/12*** | (2006.01) |
| ***G10L 19/26*** | (2013.01) |
| *G10L 21/0388* | (2013.01) |

(52) U.S. Cl.
CPC ...... *G10L 21/038* (2013.01); *G10H 2210/311* (2013.01); *G10L 21/0388* (2013.01)

(58) Field of Classification Search
CPC ......... G10H 1/06; G10L 19/265; G10L 19/26; G10L 21/038; G10L 21/0388; G10L 19/0204; G10L 19/02; G10L 25/18
See application file for complete search history.

(56) References Cited

U.S. PATENT DOCUMENTS

| | | | | |
|---|---|---|---|---|
| 5,109,417 A | 4/1992 | Fielder et al. | | |
| 5,127,054 A | 6/1992 | Hong et al. | | |
| 5,222,189 A | 6/1993 | Fielder | | |
| 5,235,671 A | 8/1993 | Mazor | | |
| 5,274,740 A | 12/1993 | Davis et al. | | |
| 5,291,557 A | 3/1994 | Davis et al. | | |
| 5,297,236 A | 3/1994 | Antill et al. | | |
| 5,357,594 A | 10/1994 | Fielder | | |
| 5,394,473 A | 2/1995 | Davidson | | |
| 5,400,433 A | 3/1995 | Davis et al. | | |
| 5,463,424 A | 10/1995 | Dressler | | |
| 5,479,562 A | 12/1995 | Fielder et al. | | |
| 5,581,653 A | 12/1996 | Todd | | |
| 5,583,962 A | 12/1996 | Davis et al. | | |
| 5,623,577 A | 4/1997 | Fielder | | |
| 5,632,003 A | 5/1997 | Davidson | | |
| 5,633,981 A | 5/1997 | Davis | | |
| 5,727,119 A | 3/1998 | Davidson et al. | | |
| 5,752,225 A | 5/1998 | Fielder | | |
| 5,890,106 A | 3/1999 | Bosi-Goldberg | | |
| 5,890,125 A | 3/1999 | Davis et al. | | |
| 5,899,969 A | 5/1999 | Fielder et al. | | |
| 5,903,872 A | 5/1999 | Fielder | | |
| 5,909,664 A | 6/1999 | Davis et al. | | |
| 5,913,190 A | 6/1999 | Fielder et al. | | |
| 5,913,191 A | 6/1999 | Fielder | | |
| 6,016,295 A | 1/2000 | Endoh | | |
| 6,021,386 A | 2/2000 | Davis et al. | | |
| 6,085,163 A | 7/2000 | Todd | | |
| 6,124,895 A | 9/2000 | Fielder | | |
| 6,226,608 B1 | 5/2001 | Fielder et al. | | |
| 6,233,718 B1 | 5/2001 | Vernon | | |
| 6,240,388 B1 | 5/2001 | Fukuchi | | |
| 6,246,345 B1 | 6/2001 | Davidson et al. | | |
| 6,363,338 B1 | 3/2002 | Ubale et al. | | |
| 6,708,145 B1 | 3/2004 | Liljeryd et al. | | |
| 6,978,236 B1 | 12/2005 | Liljeryd | | |
| 7,003,451 B2 | 2/2006 | Kjorling | | |
| 7,050,972 B2 | 5/2006 | Henn | | |
| 7,181,389 B2 | 2/2007 | Liljeryd | | |
| 7,191,121 B2 | 3/2007 | Liljeryd | | |
| 7,283,955 B2 * | 10/2007 | Liljeryd | H04B 1/667 | 704/219 |
| 7,318,035 B2 | 1/2008 | Andersen | | |
| 7,382,886 B2 | 6/2008 | Henn | | |
| 7,433,817 B2 | 10/2008 | Kjorling | | |
| 7,469,206 B2 | 12/2008 | Kjorling | | |
| 7,483,758 B2 | 1/2009 | Liljeryd | | |
| 7,487,097 B2 | 2/2009 | Engdegard | | |
| 7,548,864 B2 | 6/2009 | Kjorling | | |
| 7,577,570 B2 | 8/2009 | Kjoerling | | |
| 7,590,543 B2 | 9/2009 | Kjorling | | |
| 7,680,552 B2 | 3/2010 | Liljeryd | | |
| 2003/0187663 A1 | 10/2003 | Truman | | |
| 2004/0117177 A1 * | 6/2004 | Kjorling | G10L 25/48 | 704/E19.018 |
| 2005/0149339 A1 * | 7/2005 | Tanaka | G10L 19/0204 | 704/E21.011 |
| 2008/0260048 A1 | 10/2008 | Oomen et al. | | |
| 2009/0063140 A1 * | 3/2009 | Villemoes | G10L 19/0204 | 704/211 |

FOREIGN PATENT DOCUMENTS

| | | |
|---|---|---|
| JP | 2005173607 A | 6/2005 |
| JP | 2007101871 A | 4/2007 |
| JP | 2007-524124 A | 8/2007 |
| TW | 423143 B | 2/2001 |
| TW | 573294 B | 1/2004 |
| TW | 200742264 A | 11/2007 |
| TW | 200847648 A | 12/2008 |
| TW | I309910 B | 5/2009 |
| WO | 1998057436 A2 | 12/1998 |
| WO | 2005/104094 A1 | 11/2005 |
| WO | 2010/081892 A3 | 11/2010 |

* cited by examiner

EFFICIENT COMBINED HARMONIC TRANSPOSITION

CROSS-REFERENCE TO RELATED APPLICATIONS

This application is a continuation of U.S. patent application Ser. No. 18/439,478, filed Feb. 12, 2024, which is a continuation of U.S. patent application Ser. No. 18/194,414, filed Mar. 31, 2023, now U.S. Pat. No. 11,935,508 issued on Mar. 19, 2024, which is a continuation of U.S. patent application Ser. No. 17/549,661, filed Dec. 13, 2021, now U.S. Pat. No. 11,657,788 issued on May 23, 2023, which is a continuation of U.S. patent application Ser. No. 16/876,793, filed May 18, 2020, now U.S. Pat. No. 11,200,874 issued on Dec. 14, 2021, which is a continuation of U.S. patent application Ser. No. 16/376,433, filed Apr. 5, 2019, now U.S. Pat. No. 10,657,937 issued on May 19, 2020, which is a continuation of U.S. patent application Ser. No. 15/849,915, filed Dec. 21, 2017, now U.S. Pat. No. 10,304,431 issued on May 28, 2019, which is a continuation of U.S. patent application Ser. No. 14/882,559, filed Oct. 14, 2015, now U.S. Pat. No. 9,881,597 issued on Jan. 30, 2018, which is a continuation of U.S. patent application Ser. No. 14/614,172, filed Feb. 4, 2015, now U.S. Pat. No. 9,190,067 issued on Nov. 17, 2015, which is a continuation of U.S. patent application Ser. No. 13/321,910, filed Nov. 22, 2011, now U.S. Pat. No. 8,983,852 issued on Mar. 17, 2015, which is a 371 national application of International Patent Application No. PCT/EP2010/057176, filed May 25, 2010, which claims the benefit of priority to U.S. Provisional Patent Application No. 61/312,107, filed Mar. 9, 2010, and U.S. Provisional Patent Application No. 61/181,364, filed May 27, 2009, the contents of all of which are incorporated by reference herein in their entireties.

TECHNICAL FIELD

The present document relates to audio coding systems which make use of a harmonic transposition method for high frequency reconstruction (HFR), and to digital effect processors, e.g. so-called exciters, where generation of harmonic distortion adds brightness to the processed signal. In particular, the present document relates to low complexity methods for implementing high frequency reconstruction.

BACKGROUND OF THE INVENTION

In the patent document WO 98/57436 the concept of transposition was established as a method to recreate a high frequency band from a lower frequency band of an audio signal. A substantial saving in bitrate can be obtained by using this concept in audio coding. In an HFR based audio coding system, a low bandwidth signal, also referred to as the low frequency component of a signal, is presented to a core waveform coder, and the higher frequencies, also referred to as the high frequency component of the signal, are regenerated using signal transposition and additional side information of very low bitrate describing the target spectral shape of the high frequency component at the decoder side. For low bitrates, where the bandwidth of the core coded signal, i.e. the low band signal or low frequency component, is narrow, it becomes increasingly important to recreate a high band signal, i.e. a high frequency component, with perceptually pleasant characteristics. The harmonic transposition defined in the patent document WO 98/57436 performs well for complex musical material in a situation with low cross over frequency, i.e. in a situation of a low upper frequency of the low band signal. The principle of a harmonic transposition is that a sinusoid with frequency $\omega$ is mapped to a sinusoid with frequency $T\omega$, where $T>1$ is an integer defining the order of the transposition, i.e. the transposition order. In contrast to this, a single sideband modulation (SSB) based HFR maps a sinusoid with frequency $\omega$ to a sinusoid with frequency $\omega+\Delta\omega$, where $\Delta\omega$ is a fixed frequency shift. Given a core signal with low bandwidth, i.e. a low band signal with a low upper frequency, a dissonant ringing artifact will typically result from the SSB transposition, which may therefore be disadvantageous compared to harmonic transposition.

In order to reach improved audio quality and in order to synthesize the required bandwidth of the high band signal, harmonic HFR methods typically employ several orders of transposition. In order to implement a plurality of transpositions of different transposition order, prior art solutions require a plurality of filter banks either in the analysis stage or the synthesis stage or in both stages. Typically, a different filter bank is required for each different transposition order. Moreover, in situations where the core waveform coder operates at a lower sampling rate than the sampling rate of the final output signal, there is typically an additional need to convert the core signal to the sampling rate of the output signal, and this upsampling of the core signal is usually achieved by adding yet another filter bank. All in all, the computationally complexity increases significantly with an increasing number of different transposition orders.

SUMMARY OF THE INVENTION

The present invention provides a method for reducing the complexity of harmonic HFR methods by means of enabling the sharing of an analysis and synthesis filter bank pair by several harmonic transposers, or by one or several harmonic transposers and an upsampler. The proposed frequency domain transposition may comprise the mapping of nonlinearly modified subband signals from an analysis filter bank into selected subbands of a synthesis filter bank. The nonlinear operation on the subband signals may comprise a multiplicative phase modification. Furthermore, the present invention provides various low complexity designs of HFR systems.

According to one aspect, a system configured to generate a high frequency component of a signal from a low frequency component of the signal is described. The system may comprise an analysis filter bank configured to provide a set of analysis subband signals from the low frequency component of the signal; wherein the set of analysis subband signals typically comprises at least two analysis subband signals. The analysis filter bank may have a frequency resolution of $\Delta f$ and a number $L_A$ of analysis subbands, with $L_A>1$, where k is an analysis subband index with $k=0, \ldots, L_A-1$. In particular, the analysis filter bank may be configured to provide a set of complex valued analysis subband signals comprising magnitude samples and phase samples.

The system may further comprise a nonlinear processing unit configured to determine a set of synthesis subband signals from the set of analysis subband signals using a transposition order P; wherein the set of synthesis subband signals typically comprises a portion of the set of analysis subband signals phase shifted by an amount derived from the transposition order P. In other words, the set of synthesis subband signals may be determined based on a portion of the set of analysis subband signals phase shifted by an amount derived from the transposition order P. The phase shifting of an analysis subband signal may be achieved by multiplying the phase samples of the analysis subband signal by the amount derived from transposition factor P. As such, the set of synthesis subband signals may correspond to a portion or a subset of the set of analysis subband signals, wherein the phases of the subband samples have been multiplied by an amount derived from the transposition order. In particular, the amount derived from the transposition order may be a fraction of the transposition order.

The system may comprise a synthesis filter bank configured to generate the high frequency component of the signal from the set of synthesis subband signals. The synthesis filter bank may have a frequency resolution of $F\Delta f$; with F being a resolution factor, e.g. an integer value, with $F\geq1$; and a number $L_S$ of synthesis subbands, with $L_S>0$, where n is a synthesis subband index with $n=0, \ldots, L_S-1$. The transposition order P may be different from the resolution factor F. The analysis filter bank may employ an analysis time stride $\Delta t_A$ and the synthesis filter bank may employ a synthesis time stride $\Delta t_S$; and the analysis time stride $\Delta t_A$ and the synthesis time stride $\Delta t_S$ may be equal.

The nonlinear processing unit may be configured to determine a synthesis subband signal of the set of synthesis subband signals based on an analysis subband signal of the set of analysis subband signals phase shifted by the transposition order P; or based on a pair of analysis subband signals from the set of analysis subband signals wherein a first member of the pair of subband signals is phase shifted by a factor P' and a second member of the pair is phase shifted by a factor P", with P'+P"=P. The above operations may be performed on a sample of the synthesis and analysis subband signals. In other words, a sample of a synthesis subband signal may be determined based on a sample of an analysis subband signal phase shifted by the transposition order P; or based on a pair of samples from a corresponding pair of analysis subband signals, wherein a first sample of the pair of samples is phase shifted by a factor P' and a second sample of the pair is phase shifted by a factor P".

The nonlinear processing unit may be configured to determine an $n^{th}$ synthesis subband signal of the set of synthesis subband signals from a combination of the $k^{th}$ analysis subband signal and a neighboring $(k+1)^{th}$ analysis subband signal of the set of analysis subband signals. In particular, the nonlinear processing unit may be configured to determine a phase of the $n^{th}$ synthesis subband signal as the sum of a shifted phase of the $k^{th}$ analysis subband signal and a shifted phase of the neighboring $(k+1)^{th}$ analysis subband signal. Alternatively or in addition, the nonlinear processing unit may be configured to determine a magnitude of the $n^{th}$ synthesis subband signal as the product of an exponentiated magnitude of the $k^{th}$ analysis subband signal and an exponentiated magnitude of the neighboring $(k+1)^{th}$ analysis subband signal.

The analysis subband index k of the analysis subband signal contributing to the synthesis subband with synthesis subband index n may be given by the integer obtained by truncating the expression $$\frac{F}{P}n.$$

A remainder r of such truncating operation may be given by $$\frac{F}{P}n - k.$$

In such cases, the nonlinear processing unit may be configured to determine the phase of the $n^{th}$ synthesis subband signal as the sum of the phase of the $k^{th}$ analysis subband signal shifted by $P(1-r)$ and the phase of the neighboring $(k+1)^{th}$ analysis subband signal shifted by $P(r)$. In particular, the nonlinear processing unit may be configured to determine the phase of the $n^{th}$ synthesis subband signal as the sum of the phase of the $k^{th}$ analysis subband signal multiplied by $P(1-r)$ and the phase of the neighboring $(k+1)^{th}$ analysis subband signal multiplied by $P(r)$. Alternatively or in addition, the nonlinear processing unit may be configured to determine the magnitude of the $n^{th}$ synthesis subband signal as the product of the magnitude of the $k^{th}$ analysis subband signal raised to the power of $(1-r)$ and the magnitude of the neighboring $(k+1)^{th}$ analysis subband signal raised to the power of r.

In an embodiment, the analysis filter bank and the synthesis filter bank may be evenly stacked such that a center frequency of an analysis subband is given by $k\Delta f$ and a center frequency of a synthesis subband is given by $nF\Delta f$. In another embodiment, the analysis filter bank and the synthesis filter bank may be oddly stacked such that a center frequency of an analysis subband is given by $$\left(k+\frac{1}{2}\right)\Delta f$$

and a center frequency of a synthesis subband is given by $$\left(n+\frac{1}{2}\right)F\Delta f;$$

and the difference between the transposition order P and the resolution factor F is even.

According to another aspect, a system configured to generate a high frequency component of a signal from a low frequency component of the signal is described. The system may comprise an analysis filter bank configured to provide a set of analysis subband signals from the low frequency component of the signal; wherein the set of analysis subband signals comprises at least two analysis subband signals.

The system may further comprise a first nonlinear processing unit configured to determine a first set of synthesis subband signals from the set of analysis subband signals using a first transposition order $P_1$; wherein the first set of synthesis subband signals is determined based on a portion of the set of analysis subband signals phase shifted by an amount derived from the first transposition order $P_1$. The system may also comprise a second nonlinear processing unit configured to determine a second set of synthesis subband signals from the set of analysis subband signals using a second transposition order $P_2$; wherein the second set of synthesis subband signals is determined based on a portion of the set of analysis subband signals phase shifted by an amount derived from the second transposition order $P_2$; wherein the first transposition order P and the second transposition order $P_2$ are different. The first and second nonlinear processing unit may be configured according to any of the features and aspects outlined in the present document.

The system may further comprise a combining unit configured to combine the first and the second set of synthesis subband signals; thereby yielding a combined set of synthesis subband signals. Such combining may be performed by combining, e.g. adding and/or averaging, synthesis subband signals from the first and the second set which correspond to the same frequency ranges. In other words, the combining unit may be configured to superpose synthesis subband signals of the first and the second set of synthesis subband signals corresponding to overlapping frequency ranges. In addition, the system may comprise a synthesis filter bank configured to generate the high frequency component of the signal from the combined set of synthesis subband signals.

According to a further aspect, a system configured to generate a high frequency component of a signal from a low frequency component of the signal is described. The system may comprise an analysis filter bank having a frequency resolution of Δf. The analysis filter bank may be configured to provide a set of analysis subband signals from the low frequency component of the signal. The system may comprise a nonlinear processing unit configured to determine a set of intermediate synthesis subband signals having a frequency resolution of PΔf from the set of analysis subband signals using a transposition order P; wherein the set of intermediate synthesis subband signals comprises a portion of the set of analysis subband signals, phase shifted by the transposition order P. In particular, the nonlinear processing unit may multiply the phase of complex analysis subband signals by the transposition order. It should be noted that the transposition order P may be e.g. the transposition order P or $P_1$ or $P_2$ outlined above.

The nonlinear processing unit may be configured to interpolate one or more intermediate synthesis subband signals to determine a synthesis subband signal of a set of synthesis subband signals having a frequency resolution of FΔf; with F being the resolution factor, with F≥1. In an embodiment two or more intermediate synthesis subband signals are interpolated. The transposition order P may be different from the frequency resolution F.

The system may comprise a synthesis filter bank having a frequency resolution of FΔf. The synthesis filter bank may be configured to generate the high frequency component of the signal from the set of synthesis subband signals.

The systems described in the present document may further comprise a core decoder configured to convert an encoded bit stream into the low frequency component of the signal; wherein the core decoder may be based on a coding scheme being one of: Dolby E, Dolby Digital, AAC, HE-AAC. The system may comprise a multi-channel analysis quadrature mirror filter bank, referred to as QMF bank, configured to convert the high frequency component and/or the low frequency component into a plurality of QMF subband signals; and/or a high frequency reconstruction processing module configured to modify the QMF subband signals; and/or a multi-channel synthesis QMF bank configured to generate a modified high frequency component from the modified QMF subband signals. The systems may also comprise a downsampling unit upstream of the analysis filter bank configured to reduce a sampling rate of the low frequency component of the signal; thereby yielding a low frequency component at a reduced sampling rate.

According to another aspect, a system configured to generate a high frequency component of a signal at a second sampling frequency from a low frequency component of the signal at a first sampling frequency is described. In particular, the signal comprising the low and the high frequency component may be at the second sampling frequency. The second sampling frequency may be R times the first sampling frequency, wherein R 1. The system may comprise a harmonic transposer of order T configured to generate a modulated high frequency component from the low frequency component; wherein the modulated high frequency component may comprise or may be determined based on a spectral portion of the low frequency component transposed to a T times higher frequency range. The modulated high frequency component may be at the first sampling frequency multiplied by a factor S; wherein T>1 and S≤R. In other words, the modulated high frequency component may be at a sampling frequency which is lower than the second sampling frequency. In particular, the modulated high frequency component may be critically (or close to critically) sampled.

The system may comprise an analysis quadrature mirror filter bank, referred to as QMF bank, configured to map the modulated high frequency component into at least one of X QMF subbands; wherein X is a multiple of S; thereby yielding at least one QMF subband signal; and/or a high frequency reconstruction module configured to modify the at least one QMF subband signal, e.g. scale one or more QMF subband signals; and/or a synthesis QMF bank configured to generate the high frequency component from the at least one modified QMF subband signal.

The harmonic transposer may comprise any of the features and may be configured to perform any of the method steps outlined in the present document. In particular, the harmonic transposer may comprise an analysis filter bank configured to provide a set of analysis subband signals from the low frequency component of the signal. The harmonic transposer may comprise a nonlinear processing unit associated with the transposition order T and configured to determine a set of synthesis subband signals from the set of analysis subband signals by altering a phase of the set of analysis subband signals. As outlined above, the altering of the phase may comprise multiplying the phase of complex samples of the analysis subband signals. The harmonic transposer may comprise a synthesis filter bank configured to generate the modulated high frequency component of the signal from the set of synthesis subband signals.

The low frequency component may have a bandwidth B. The harmonic transposer may be configured to generate a set of synthesis subband signals which embraces or spans a frequency range (T−1)*B up to T*B. In such cases, the harmonic transposer may be configured to modulate the set of synthesis subband signals into a baseband centered around the zero frequency, thereby yielding the modulated high frequency component. Such modulation may be performed by highpass filtering a time domain signal generated from a set of subband signals including the set of synthesis subband signals and by subsequent modulation and/or downsampling of the filtered time domain signal. Alternatively or in addition, such modulation may be performed by directly generating a modulated time domain signal from the set of synthesis subband signals. This may be achieved by using a synthesis filter bank of a smaller than nominal size. For example, if the synthesis filter bank has a nominal size of L and the frequency range from (T−1)*B up to T*B corresponds to synthesis subband indices from $k_0$ to $k_1$, the synthesis subband signals may be mapped to subband indices from 0 to $k_1-k_0$ in a $k_1-k_0$ ($<L$) size synthesis filter bank, i.e. a synthesis filter bank having a size $k_1-k_0$ which is smaller than L.

The system may comprise downsampling means upstream of the harmonic transposer configured to provide a critically (or close to critically) downsampled low frequency component at the first sampling frequency divided by a downsampling factor Q from the low frequency component of the signal. In such cases, the different sampling frequencies in the system may be divided by the downsampling factor Q. In particular, the modulated high frequency component may be at the first sampling frequency multiplied by a factor S and divided by the downsampling factor Q. The size of the analysis QMF bank X may be a multiple of S/Q.

According to a further aspect, a method for generating a high frequency component of a signal from a low frequency component of the signal is described. The method may comprise the step of providing a set of analysis subband signals from the low frequency component of the signal using an analysis filter bank having a frequency resolution of Δf; wherein the set of analysis subband signals comprises at least two analysis subband signals. The method may further comprise the step of determining a set of synthesis subband signals from the set of analysis subband signals using a transposition order P; wherein the set of synthesis subband signals is determined based on a portion of the set of analysis subband signals phase shifted by an amount derived from the transposition order P. Furthermore, the method may comprise the step of generating the high frequency component of the signal from the set of synthesis subband signals using a synthesis filter bank (504) having a frequency resolution of FΔf; with F being a resolution factor, with F≥1; wherein the transposition order P is different from the resolution factor F.

According to another aspect, a method for generating a high frequency component of a signal from a low frequency component of the signal is described. The method may comprise the step of providing a set of analysis subband signals from the low frequency component of the signal; wherein the set of analysis subband signals may comprise at least two analysis subband signals. The method may comprise the step of determining a first set of synthesis subband signals from the set of analysis subband signals using a first transposition order $P_1$; wherein the first set of synthesis subband signals comprises a portion of the set of analysis subband signals phase shifted by an amount derived from the first transposition order $P_1$. Furthermore, the method may comprise the step of determining a second set of synthesis subband signals from the set of analysis subband signals using a second transposition order $P_2$; wherein the second set of synthesis subband signals comprises a portion of the set of analysis subband signals phase shifted by an amount derived by the second transposition order $P_2$. The first transposition order $P_1$ and the second transposition order $P_2$ may be different. The first and the second set of synthesis subband signals may be combined to yield a combined set of synthesis subband signals and the high frequency component of the signal may be generated from the combined set of synthesis subband signals.

According to another aspect a method for generating a high frequency component of a signal from a low frequency component of the signal is described. The method may comprise the step of providing a set of analysis subband signals having a frequency resolution of Δf from the low frequency component of the signal. The method may further comprise the step of determining a set of intermediate synthesis subband signals having a frequency resolution of PΔf from the set of analysis subband signals using a transposition order P; wherein the set of intermediate synthesis subband signals comprises a portion of the set of analysis subband signals phase shifted by the transposition order P. One or more intermediate synthesis subband signals may be interpolated to determine a synthesis subband signal of a set of synthesis subband signals having a frequency resolution of FΔf; with F being a resolution factor, with F≥1; wherein the transposition order $P_2$ may be different from the frequency resolution F. The high frequency component of the signal may be generated from the set of synthesis subband signals.

According to a further aspect, a method for generating a high frequency component of a signal at a second sampling frequency from a low frequency component of the signal at a first sampling frequency is described. The second sampling frequency may be R times the first sampling frequency, with R≥1. The method may comprise the step of generating a modulated high frequency component from the low frequency component by applying harmonic transposition of order T; wherein the modulated high frequency component comprises a spectral portion of the low frequency component transposed to a T times higher frequency range; wherein the modulated high frequency component is at the first sampling frequency multiplied by a factor S; wherein T>1 and S≤R. In an embodiment, S<R.

According to another aspect, a set-top box for decoding a received signal comprising at least an audio signal is described. The set-top box may comprise a system for generating the high frequency component of the audio signal from the low frequency component of the audio signal. The system may comprise any of the aspects and features outlined in the present document.

According to another aspect, a software program is described. The software program may be adapted for execution on a processor and for performing any of the aspects and method steps outlined in the present document when carried out on a computing device.

According to a further aspect, a storage medium is described. The storage medium may comprise a software program adapted for execution on a processor and for performing any of the aspects and method steps outlined in the present document when carried out on a computing device.

According to another aspect, a computer program product is described. The computer program product may comprise executable instructions for performing any of the aspects and method steps outlined in the present document when executed on a computer.

It should be noted that the embodiments and aspects described in this document may be arbitrarily combined. In particular, it should be noted that the aspects and features outlined in the context of a system are also applicable in the context of the corresponding method and vice versa. Furthermore, it should be noted that the disclosure of the present document also covers other claim combinations than the claim combinations which are explicitly given by the back references in the dependent claims, i.e., the claims and their technical features can be combined in any order and any formation.

BRIEF DESCRIPTION OF THE DRAWINGS

The present invention will now be described by way of illustrative examples, not limiting the scope or spirit of the invention, with reference to the accompanying drawings, in which.

DESCRIPTION OF PREFERRED EMBODIMENTS

The below-described embodiments are merely illustrative for the principles of the present invention for efficient combined harmonic transposition. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Figure 1:
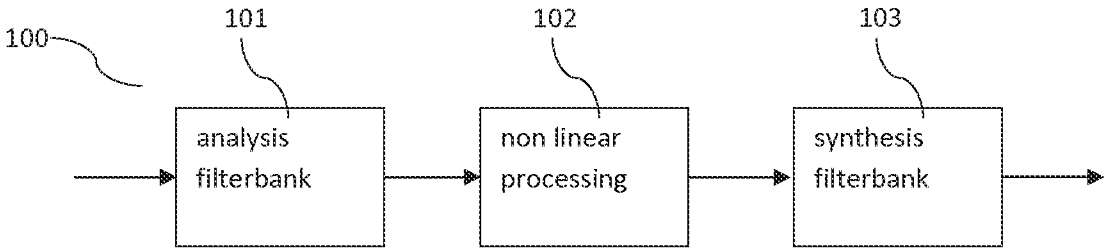
FIG. 1 illustrates the operation of an example single order frequency domain (FD) harmonic transposer.

FIG. 1 illustrates the operation of a frequency domain (FD) harmonic transposer 100. In a basic form, a $T^{th}$ order harmonic transposer is theoretically a unit that shifts all signal components of the input signal to a T times higher frequency. In order to implement such transposition in the frequency domain, an analysis filter bank (or transform) 101 transforms the input signal from the time-domain to the frequency domain and outputs complex subbands or subband signals, also referred to as the analysis subbands or analysis subband signals. The analysis subband signals are submitted to nonlinear processing 102 modifying the phase and/or the amplitude according to the chosen transposition order T. Typically, the nonlinear processing outputs a number of subband signals which is equal to the number of input subband signals, i.e. equal to the number of analysis subband signals. However, it is proposed in the context of an advanced nonlinear processing to output a number of subband signals which is different from the number of input subband signals. In particular, two input subband signals may be processed in a nonlinear manner in order to generate one output subband signal. This will be outlined in further detail below. The modified subbands or subband signals, which are also referred to as the synthesis subbands or synthesis subband signals, are fed to a synthesis filter bank (or transform) 103 which transforms the subband signals from the frequency domain into the time domain and outputs the transposed time domain signal.

Typically, each filter bank has a physical frequency resolution measured in Hertz and a time stride parameter measured in seconds. These two parameters, i.e. the frequency resolution and the time stride, define the discrete-time parameters of the filter bank given the chosen sampling rate. By choosing the physical time stride parameters, i.e. the time stride parameter measured in time units e.g. seconds, of the analysis and synthesis filter banks to be identical, an output signal of the transposer 100 may be obtained which has the same sampling rate as the input signal. Furthermore, by omitting the nonlinear processing 102 a perfect reconstruction of the input signal at the output may be achieved. This requires a careful design of the analysis and synthesis filter banks. On the other hand, if the output sampling rate is chosen to be different from the input sampling rate, a sampling rate conversion may be obtained. This mode of operation may be necessary, e.g. when applying signal transposition where the desired output bandwidth is larger than the half of the input sampling rate, i.e. when the desired output bandwidth exceeds the Nyqvist frequency of the input signal.

Figure 2:
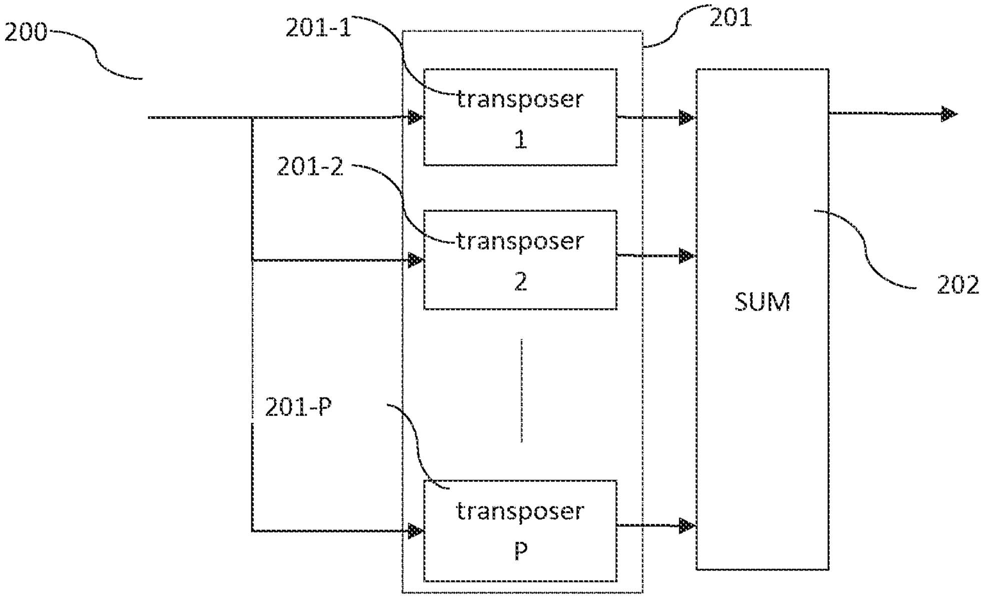
FIG. 2 illustrates the operation of an example harmonic transposer using several orders.

FIG. 2 illustrates the operation of a multiple transposer or multiple transposer system 200 comprising several harmonic transposers 201-1, . . . , 201-P of different orders. The input signal which is to be transposed is passed to a bank of P individual transposers 201-1, 201-2, . . . , 201-P. The individual transposers 201-1, 201-2, . . . , 201-P perform a harmonic transposition of the input signal as outlined in the context of FIG. 1. Typically, each of the individual transposers 201-1, 201-2, . . . , 201-P performs a harmonic transposition of a different transposition order T. By way of example, transposer 201-1 may perform a transposition of order T=1, transposer 201-2 may perform a transposition of order T=2, . . . , and transposer 201-P may perform a transposition of order T=P. The contributions, i.e. the output signals of the individual transposers 201-1, 201-2, . . . , 201-P may be summed in the combiner 202 to yield the combined transposer output.

It should be noted that each transposer 201-1, 201-2, . . . , 201-P requires an analysis and a synthesis filter bank as depicted in FIG. 1. Moreover, the usual implementation of the individual transposers 201-1, 201-2, . . . , 201-P will typically change the sampling rate of the processed input signal by different amounts. By way of example, the sampling rate of the output signal of the transposer 201-P may be P times higher than the sampling rate of the input signal to the transposer 201-P. This may be due to a bandwidth expansion factor of P used within the transposer 201-P, i.e. due to the use of a synthesis filter bank which has P times more subband channels than the analysis filter bank. By doing this the sampling rate and the Nyqvist frequency is increased by a factor P. As a consequence, the individual time domain signals may need to be resampled in order to allow for combining of the different output signals in the combiner 202. The resampling of the time domain signals can be carried out on the input signal or the output signal to each individual transposer 201-1, 201-2, . . . 201-P.

Figure 3:
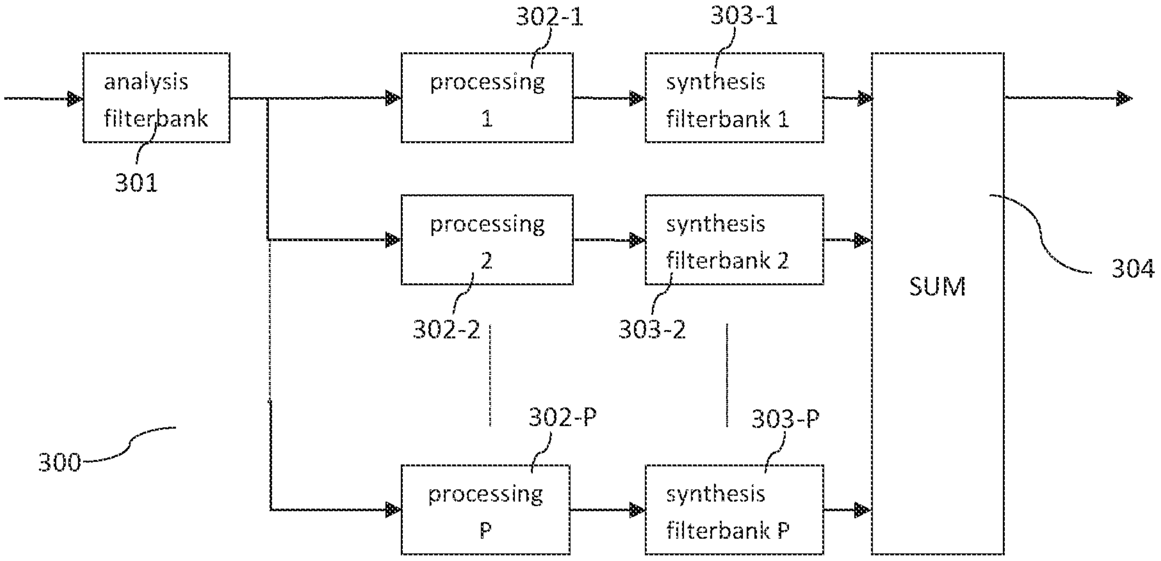
FIG. 3 illustrates prior art operation of an example harmonic transposer using several orders of transposition, while using a common analysis filter bank.

FIG. 3 illustrates an exemplary configuration of a multiple harmonic transposer or multiple transposer system 300 performing several orders of transposition and using a common analysis filter bank 301. A starting point for the design of the multiple transposer 300 may be to design the individual transposers 201-1, 201-2, . . . , 201-P of FIG. 2 such that the analysis filter banks (reference sign 101 in FIG. 1) of all transposers 201-1, 201-2, . . . , 201-P are identical and can be replaced by a single analysis filter bank 301. As a consequence, the time domain input signal is transformed into a single set of frequency domain subband signals, i.e. a single set of analysis subband signals. These subband signals are submitted to different nonlinear processing units 302-1, 302-2, . . . , 302-P for different orders of transposition. As outlined above in the context of FIG. 1, nonlinear processing comprises a modification of the phase and/or amplitude of the subband signals and this modification differs for different orders of transposition. Subsequently, the differently modified subband signals or subbands have to be submitted to different synthesis filter banks 303-1, 303-2, . . . , 303-P corresponding to the different nonlinear processing 302-1, 302-2, . . . , 302-P. As an outcome, P differently transposed time domain output signals are obtained which are summed in the combiner 304 to yield the combined transposer output.

It should be noted that if the synthesis filter banks 303-1, 303-2, . . . , 303-P corresponding to the different transposition orders operate at different sampling rates, e.g. by using different degrees of bandwidth expansion, the time domain output signals of the different synthesis filter banks 303-1, 303-2, . . . , 303-P need to be differently resampled in order to align the P output signals to the same time grid, prior to their summation in combiner 304.

Figure 4:
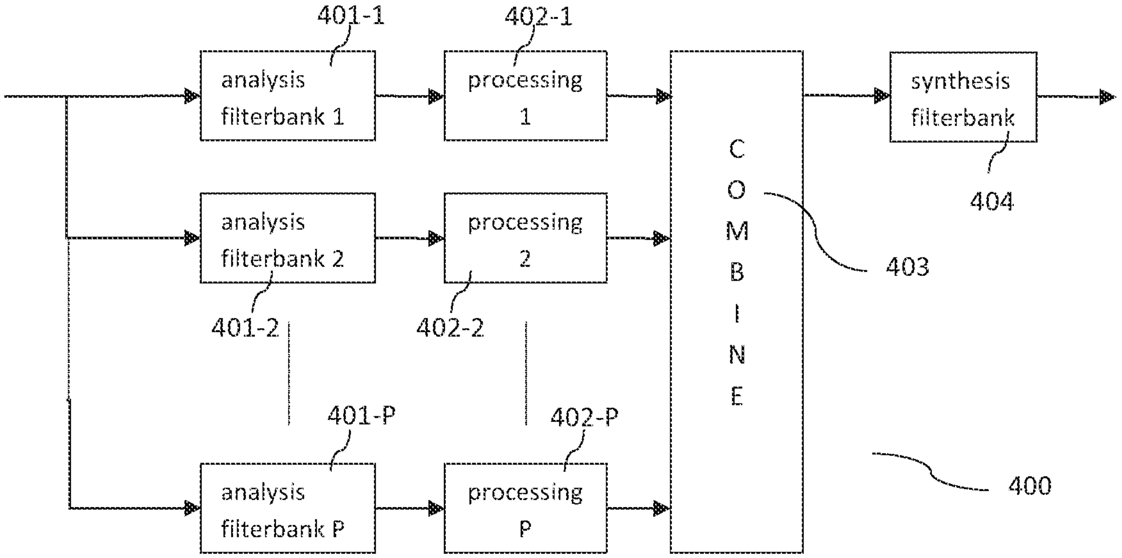
FIG. 4 illustrates prior art operation of an example harmonic transposer using several orders of transposition, while using a common synthesis filter bank.

FIG. 4 illustrates an example configuration of a multiple harmonic transposer system 400 using several orders of transposition, while using a common synthesis filter bank 404. The starting point for the design of such a multiple transposer 400 may be the design of the individual transposers 201-1, 201-2, . . . , 201-P of FIG. 2 such that the synthesis filter banks of all transposers are identical and can be replaced by a single synthesis filter bank 404. It should be noted that in an analogous manner as in the situation shown in FIG. 3, the nonlinear processing 402-1, 402-2, . . . , 402-P is different for each transposition order. Furthermore, the analysis filter banks 401-1, 401-2, . . . , 401-P are different for the different transposition orders. As such, a set of P analysis filter banks 401-1, 401-2, . . . , 401-P determines P sets of analysis subband signals. These P sets of analysis subband signals are submitted to corresponding nonlinear processing units 402-1, 402-2, . . . , 402-P to yield P sets of modified subband signals. These P sets of subband signals may be combined in the frequency domain in the combiner 403 to yield a combined set of subband signals as an input to the single synthesis filter bank 404. This signal combination in combiner 403 may comprise the feeding of differently processed subband signals into different subband ranges and/or the superposing of contributions of subband signals to overlapping subband ranges. In other words, different analysis subband signals which have been processed with different transposition orders may cover overlapping frequency ranges. In such cases, the superposing contributions may be combined, e.g. added and/or averaged, by the combiner 403. The time domain output signal of the multiple transposer 400 is obtained from the common synthesis filter bank 404. In a similar manner as outlined above, if the analysis filter banks 401-1, 401-2, . . . , 401-P operate at different sampling rates, the time domain signals input to the different analysis filter banks 401-1, 401-2, . . . , 401-P may need to be resampled in order to align the output signals of the different nonlinear processing units 402-1, 402-2, . . . , 402-P to the same time grid.

Figure 5:
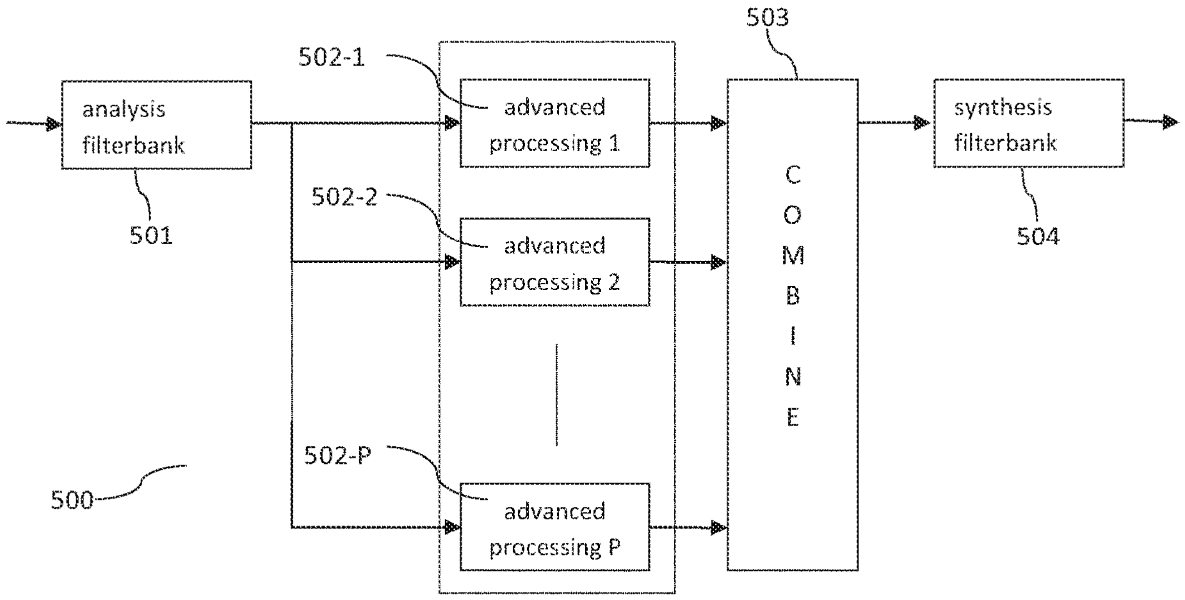
FIG. 5 illustrates the operation of an example harmonic transposer using several orders of transposition, while using a common synthesis filter bank and a common synthesis filter bank.

FIG. 5 illustrates the operation of a multiple harmonic transposer system 500 using several orders of transposition and comprising a single common analysis filter bank 501 and a single common synthesis filter bank 504. In this case, the individual transposers 201-1, 201-2, . . . , 201-P of FIG. 2 should be designed such that both, the analysis filter banks and the synthesis filter banks of all the P harmonic transposers are identical. If the condition of identical analysis and synthesis filter banks for the different P harmonic transposers is met, then the identical filter banks can be replaced by a single analysis filter bank 501 and a single synthesis filter bank 504. The advanced nonlinear processing units 502-1, 502-2, . . . , 502-P output different contributions that are combined in the combiner 503 to yield a combined input to the respective subbands of the synthesis filter bank 504. Similarly to the multiple harmonic transposer 400 depicted in FIG. 4, the signal combination in the combiner 503 may comprise the feeding of differently processed outputs of the nonlinear processing units 502-1, 502-2, . . . , 502-P into different subband ranges, and the superposing of multiple contributing outputs to overlapping subband ranges.

As already indicated above, the nonlinear processing 102 typically provides a number of subbands at the output which corresponds to the number of subbands at the input. The non-linear processing 102 typically modifies the phase and/or the amplitude of the subband or the subband signal according to the underlying transposition order T. By way of example a subband at the input is converted to a subband at the output with T times higher frequency, i.e. a subband at the input to the nonlinear processing 102, i.e. the analysis subband, $$\left[\left(k-\frac{1}{2}\right)\Delta f,\left(k+\frac{1}{2}\right)\Delta f\right]$$

may be transposed to a subband at the output of the nonlinear processing 102, i.e. the synthesis subband, $$\left[\left(k-\frac{1}{2}\right)T\Delta f,\left(k+\frac{1}{2}\right)T\Delta f\right],$$

wherein k is a subband index number and Δf if the frequency resolution of the analysis filter bank. In order to allow for the use of common analysis filter banks 501 and common synthesis filter banks 504, one or more of the advanced processing units 502-1, 502-2, . . . , 502-P may be configured to provide a number of output subbands which is different from the number of input subbands. In an embodiment, the number of input subbands into an advanced processing unit 502-1, 502-2, . . . , 502-P may be roughly F/T times the number of output subbands, where T is the transposition order of the advanced processing unit and F is a filter bank resolution factor introduced below.

In the following, the principles of advanced nonlinear processing in the nonlinear processing units 502-1, 502-2, . . . , 502-P will be outlined. For this purpose, it is assumed that the analysis filter bank and the synthesis filter bank share the same physical time stride parameter Δt.

the analysis filter bank has a physical frequency resolution Δf.

the synthesis filter bank has physical frequency resolution FΔf where the resolution factor F≥1 is an integer.

Furthermore, it is assumed that the filter banks are evenly stacked, i.e. the subband with index zero is centered around the zero frequency, such that the analysis filter bank center frequencies are given by kΔf where the analysis subband index k=0, 1, . . . $L_A$−1 and $L_A$ is the number of subbands of the analysis filter bank. The synthesis filter bank center frequencies are given by nFΔf where the synthesis subband index n=0, 1, . . . $L_S$−1 and $L_S$ is the number of subbands of the synthesis filter bank.

When performing a conventional transposition of integer order T≥1 as shown in FIG. 1, the resolution factor F is selected as F=T, and the nonlinearly processed analysis subband k is mapped into the synthesis subband with the same index n=k. The nonlinear processing 102 typically comprises multiplying the phase of a subband or subband signal by the factor T. I.e. for each sample of the filter bank subbands one may write $$\theta_S(k) = T\theta_A(k), \tag{1}$$

where $\theta_A(k)$ is the phase of a sample of the analysis subband k and $\theta_S(k)$ is the phase of a sample of the synthesis subband k. The magnitude or amplitude of a sample of the subband may be kept unmodified or may be increased or decreased by a constant gain factor. Due to the fact that T is an integer, the operation of equation (1) is independent of the definition of the phase angle.

If the resolution factor F is selected to be equal to the transposition order T, i.e. F=T, then the frequency resolution of the synthesis filter bank, i.e. FΔf, depends on the transposition order T. Consequently, it is necessary to use different filter banks for different transposition orders T either in the analysis or synthesis stage. This is due to the fact that the transposition order T defines the quotient of physical frequency resolutions, i.e. the quotient of the frequency resolution Δf of the analysis filter bank and the frequency resolution FΔf of the synthesis filter bank.

In order to be able to use a common analysis filter bank 501 and a common synthesis filter bank 504 for a plurality of different transposition orders T, it is proposed to set the frequency resolution of the synthesis filter bank 504 to FΔf, i.e. it is proposed to make the frequency resolution of the synthesis filter bank 504 independent of the transposition order T. Then the question arises of how to implement a transposition of order T when the resolution factor F, i.e. the quotient F of the physical frequency resolution of the analysis and synthesis filter bank, does not necessarily obey the relation F=T.

As outlined above, a principle of harmonic transposition is that the input to the synthesis filter bank subband n with center frequency nFΔf is determined from an analysis subband at a T time lower center frequency, i.e. at the center frequency nFΔf/T. The center frequencies of the analysis subbands are identified through the analysis subband index k as kΔf. Both expressions for the center frequency of the analysis subband index, i.e. nFΔf IT and kΔf, may be equated. Taking into account that the index n is an integer value, the expression $$\frac{nF}{T}$$

is a rational number which can be expressed as the sum of an integer analysis subband index k and a remainder r∈{0, 1/T, 2/T, . . . (T−1)/T} such that $$\frac{nF}{T} = k + r. \tag{2}$$

As such, it may be stipulated that the input to a synthesis subband with synthesis subband index n may be derived, using a transposition of order T, from the analysis subband or subbands k with the index given by equation (2). In view of the fact that $$\frac{nF}{T}$$

is a rational number, the remainder r may be unequal to 0 and the value k+r may be greater than the analysis subband index k and smaller than the analysis subband index k+1. Consequently, the input to a synthesis subband with synthesis subband index n should be derived, using a transposition of order T, from the analysis subbands with the analysis subband index k and k+1, wherein k is given by equation (2).

As an outcome of the above analysis, the advanced nonlinear processing performed in a nonlinear processing unit 502-1, 502-2, . . . , 502-P may comprise, in general, the step of considering two neighboring analysis subbands with index k and k+1 in order to provide the output for synthesis subband n. For a transposition order T, the phase modification performed by the nonlinear processing unit 502-1, 502-2, . . . , 502-P may therefore be defined by the linear interpolation rule, $$\theta_S(n) = T(1-r)\theta_A(k) + Tr\theta_A(k+1), \tag{3}$$

where $\theta_A(k)$ is the phase of a sample of the analysis subband k, $\theta_A(k+1)$ is the phase of a sample of the analysis subband k+1, and $\theta_S(k)$ is the phase of a sample of the synthesis subband n. I.e. if the remainder r is close to zero, i.e. if the value k+r is close to k, then the main contribution of the phase of the synthesis subband sample is derived from the phase of the analysis subband sample of subband k. On the other hand, if the remainder r is close to one, i.e. if the value k+r is close to k+1, then the main contribution of the phase of the synthesis subband sample is derived from the phase of the analysis subband sample of subband k+1. It should be noted that the phase multipliers T(1−r) and T r are both integers such that the phase modifications of equation (3) are well defined and independent of the definition of the phase angle.

Concerning the magnitudes of the subband samples, the following geometrical mean value may be selected for the determination of the magnitude of the synthesis subband samples, $$a_S(n) = a_A(k)^{(1-r)} a_A(k+1)^r, \tag{4}$$

where $a_S(n)$ denotes the magnitude of a sample of the synthesis subband n, $a_A(k)$ denotes the magnitude of a sample of the analysis subband k and $a_A$ (k+1) denotes the magnitude of a sample of the analysis subband k+1.

For the case of an oddly stacked filter bank where the analysis filter bank center frequencies are given by $$\left(k+\frac{1}{2}\right)\Delta f \text{ with } k=0, 1, \ldots L_A-1$$

and the synthesis filter bank center frequencies are given by $$\left(n+\frac{1}{2}\right)F\Delta f \text{ with } n=0, 1, \ldots L_S-1,$$

a corresponding equation to equation (2) may derived by equating the transposed synthesis filter bank center frequency $$\left(n+\frac{1}{2}\right)\frac{F\Delta f}{T}$$

and the analysis filter bank center frequency $$\left(k+\frac{1}{2}\right)\Delta f.$$

Assuming an integer index k and a remainder r∈[0,1[ the following equation for oddly stacked filter banks can be derived:

$$\frac{\left(n+\frac{1}{2}\right)F}{T}=k+\frac{1}{2}+r. \tag{5}$$

It can be seen that if T−F, i.e. the difference between the transposition order and the resolution factor, is even, T(1−r) and T r are both integers and the interpolation rules of equations (3) and (4) can be used.

Figure 5B:
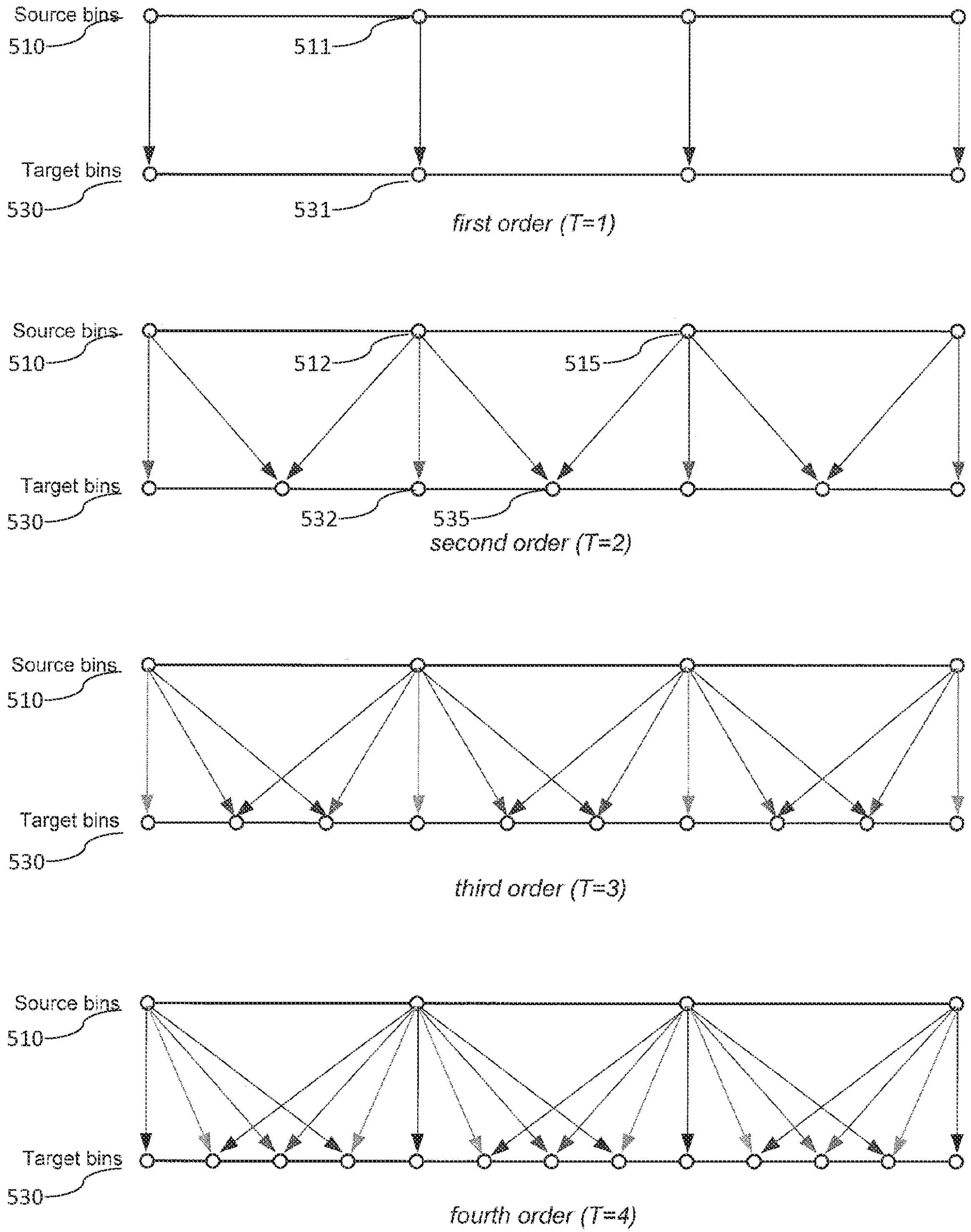
FIGS. 5*b* and 5*c* illustrate examples for the mapping of subband signals for a multiple transposer scheme according to FIG. 5.

The mapping of analysis subbands into synthesis subbands is illustrated in FIG. 5*b*. FIG. 5*b* shows four diagrams for different transposition orders T=1 to T=4. Each diagram illustrates how the source bins 510, i.e. the analysis subbands, are mapped into target bins 530, i.e. synthesis subbands. For ease of illustration, it is assumed that the resolution factor F is equal to one. In other words, FIG. 5*b* illustrates the mapping of analysis subband signals to synthesis subband signals using Eq. (2) and (3). In the illustrated example the analysis/synthesis filter bank is evenly stacked, with F=1 and the maximum transposition order P=4.

In the illustrated case, equation (2) may be written as $$\frac{n}{T}=k+r.$$

Consequently, for a transposition order T=1, an analysis subband with an index k is mapped to a corresponding synthesis subband n and the remainder r is always zero. This can be seen in FIG. 5*b* where a source bin 511 is mapped one to one to a target bin 531.

In case of a transposition order T=2, the remainder r takes on the values 0 and ½ and a source bin is mapped to a plurality of target bins. When reversing the perspective, it may be stated that each target bin 532, 535 receives a contribution from up to two source bins. This can be seen in FIG. 5*b*, where the target bin 535 receives a contribution from source bins 512 and 515. However, the target bin 532 receives a contribution from source bin 512 only. If it is assumed that target bin 532 has an even index n, e.g. n=10, then equation (2) specifies that target bin 532 receives a contribution from the source bin 512 with an index k=n/2, e.g. k=5. The remainder r is zero in this case, i.e. there is no contribution from the source bin 515 with index k+1, e.g. k+1=6. This changes for target bin 535 with an odd index n, e.g. n=11. In this case, equation (2) specifies that target bin 535 receives contributions from the source bin 512 (index k=5) and source bin 515 (index k+1=6). This applies in a similar manner to higher transposition order T, e.g. T=3 and T=4, as shown in FIG. 5*b*.

Figure 5C:
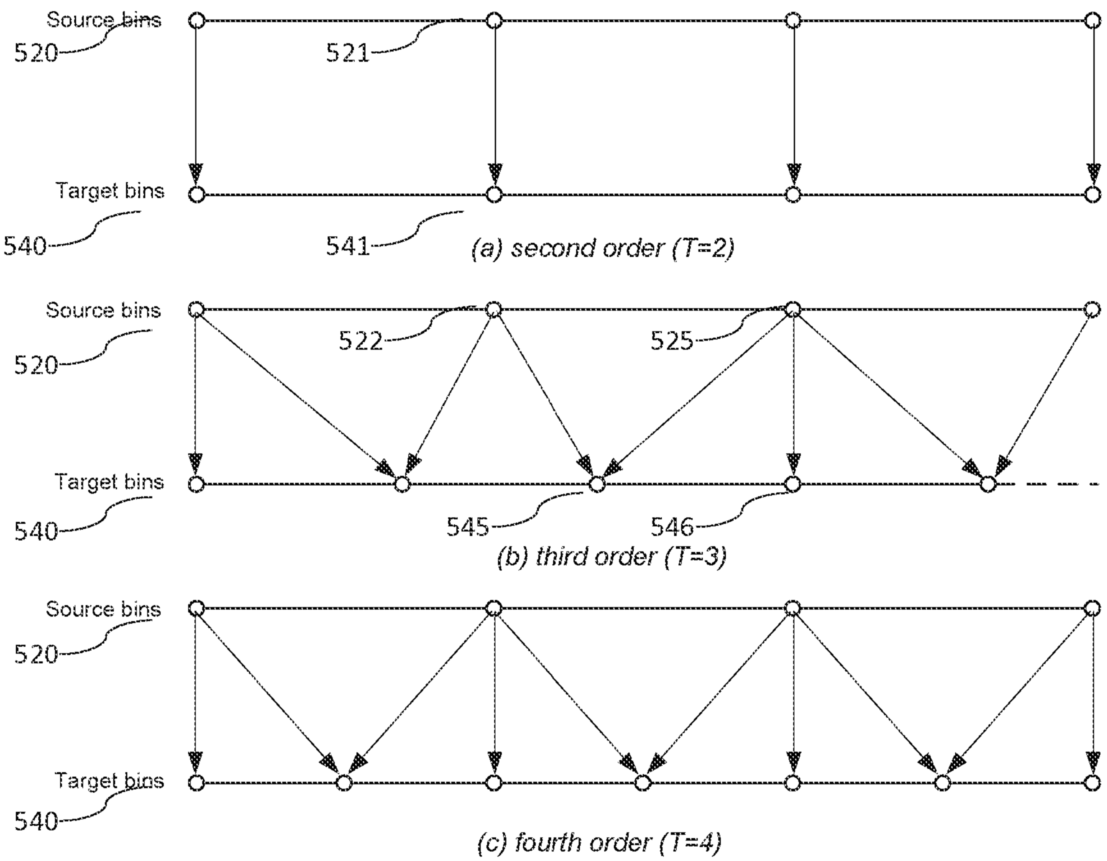

The similar situation for the case of F=2, where equation (2) may be written as $$\frac{2n}{T}=k+r$$

is depicted in FIG. 5*c*. For a transposition order T=2, an analysis subband with an index k is mapped to a corresponding synthesis subband n and the remainder r is always zero. This can be seen in FIG. 5*c* where a source bin 521 is mapped one to one to a target bin 541.

In case of a transposition order T=3, the remainder r takes on the values 0, ⅓, and ⅔ and a source bin is mapped to a plurality of target bins. When reversing the perspective, it may be stated that each target bin 542, 545 receives a contribution from up to two source bins. This can be seen in FIG. 5*c*, where the target bin 545 receives a contribution from source bins 522 and 525. If it is assumed that target bin 545 has index e.g. n=8, then equation (2) specifies that k=5 and r=⅓, so target bin 545 receives contributions from the source bin 522 (index k=5) and source bin 525 (index k+1=6). However, for target bin 546 with index n=9, the remainder r is zero such that the target bin 546 receives a contribution from source bin 525 only. This applies in a similar manner to higher transposition order T, e.g. T=4, as shown in FIG. 5*c*.

A further interpretation of the above advanced nonlinear processing may be as follows. The advanced nonlinear processing may be understood as a combination of a transposition of a given order T and a subsequent mapping of the transposed subband signals to a frequency grid defined by the common synthesis filter bank, i.e. by a frequency grid FΔf. In order to illustrate this interpretation, reference is made again to FIG. 5*b* or 5*c*. However, in the present case, the source bins 510 or 520 are considered to be synthesis subbands derived from the analysis subbands using an order of transposition T. These synthesis subbands have a frequency grid given by TΔf. In order to generate synthesis subband signals on a pre-defined frequency grid FΔf given by the target bins 530 or 540, the source bins 510 or 520, i.e. the synthesis subbands having the frequency grid TΔf, need to be mapped onto the pre-defined frequency grid FΔf. This can be performed determining a target bin 530 or 540, i.e. a synthesis subband signal on the frequency grid FΔf, by interpolating one or two source bins 510 or 520, i.e. synthesis subband signals on the frequency grid TΔf. In a preferred embodiment, linear interpolation is used, wherein the weights of the interpolation are inversely proportional to the difference between the center frequency of the target bin 530 or 540 and the corresponding source bin 510 or 520. By way of example, if the difference is zero, then the weight is 1, and if the difference is TΔf then the weight is 0.

In summary, a nonlinear processing method has been described which allows the determination of contributions to a synthesis subband by means of the transposition of several analysis subbands. The nonlinear processing method enables the use of single common analysis and synthesis subband filter banks for different transposition orders, thereby significantly reducing the computational complexity of multiple harmonic transposers.

In the following various embodiments of multiple harmonic transposers or multiple harmonic transposer systems are described. In audio source coding/decoding systems employing HFR (high frequency reconstruction), such as SBR (spectral band replication) specified e.g. in WO 98/57436 which is incorporated by reference, a typical scenario is that the core decoder, i.e. the decoder of a low frequency component of an audio signal, outputs a time domain signal to the HFR module or HFR system, i.e. the module or system performing the reconstruction of the high frequency component of the audio signal. The low frequency component may have a bandwidth which is lower than half the bandwidth of the original audio signal comprising the low frequency component and the high frequency component. Consequently, the time domain signal comprising the low frequency component, also referred to as the low band signal, may be sampled at half the sampling rate of the final output signal of the audio coding/decoding system. In such cases, the HFR module will have to effectively resample the core signal, i.e. the low band signal, to twice the sampling frequency in order to facilitate the core signal to be added to the output signal. Hence, the so-called bandwidth extension factor applied by the HFR module equals 2.

After generation of a high frequency component, also referred to as the HFR generated signal, the HFR generated signal is dynamically adjusted to match the HFR generated signal as close as possible to the high frequency component of the original signal, i.e. to the high frequency component of the originally encoded signal. This adjustment is typically performed by a so-called HFR processor by means of transmitted side information. The transmitted side information may comprise information on the spectral envelope of the high frequency component of the original signal and the adjustment of the HFR generated signal may comprise the adjustment of the spectral envelope of the HRF generated signal.

In order to perform the adjustment of the HFR generated signal according to the transmitted side information, the HFR generated signal is analyzed by a multichannel QMF (Quadrature Mirror Filter) bank which provides spectral QMF subband signals of the HFR generated signal. Subsequently, the HFR processor performs the adjustment of the HFR generated signal on the spectral QMF subband signals obtained from analysis QMF banks. Eventually, the adjusted QMF subband signals are synthesized in a synthesis QMF bank. In order to perform a modification of the sampling frequency, e.g. in order to double the sampling frequency from the sampling frequency of the low band signal to the sampling frequency of the output signal of the audio coding/decoding system, the number of analysis QMF bands may be different from the number of synthesis QMF bands. In an embodiment, the analysis QMF bank generates 32 QMF subband signals and the synthesis QMF bank processes 64 QMF subbands, thereby providing a doubling of the sampling frequency. It should be noted that typically the analysis and/or synthesis filter banks of the transposer generate several hundred analysis and/or synthesis subbands, thereby providing a significantly higher frequency resolution than the QMF banks.

Figure 6:
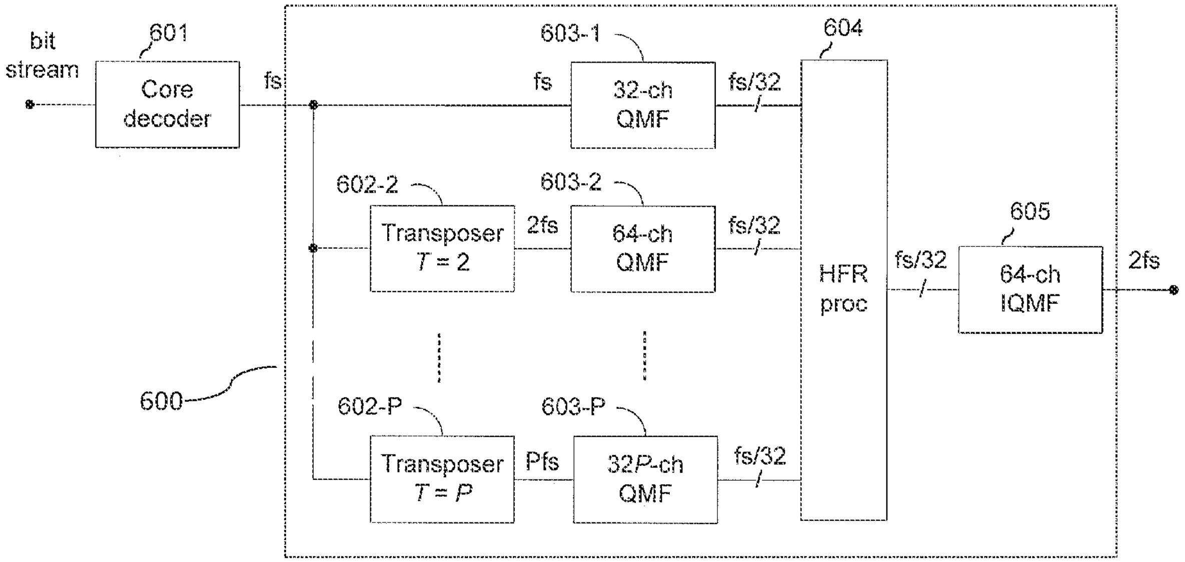
FIG. 6 illustrates a first example scenario for the application of harmonic transposition using several orders of transposition in a HFR enhanced audio codec.

An example of a process for the generation of a high frequency component of a signal is illustrated in the HFR system 600 of FIG. 6. A transmitted bit-stream is received at the core decoder 601, which provides a low frequency component of the decoded output signal at a sampling frequency $f_S$. The low frequency component at sampling frequency $f_S$ is input into the different individual transposers 602-2, . . . , 602-P, wherein each single transposer corresponds to a single transposer of transposition order T=2, . . . , P as illustrated in FIG. 1. The individually transposed signals for T=1, 2, . . . , P are separately fed to specific instances of separate analysis QMF banks 603-1, . . . , 603-P. It should be noted that the low frequency component is considered to be the transposed signal of order T=1. The resampling of the core signal, i.e. the resampling of the low frequency component at sampling frequency $f_S$, is achieved by filtering the low frequency component using a downsampled QMF bank 603-1, typically having 32 channels instead of 64 channels. As an outcome, 32 QMF subband signals are generated, wherein each QMF subband signal has a sampling frequency $f_S/32$.

Figure 12A:
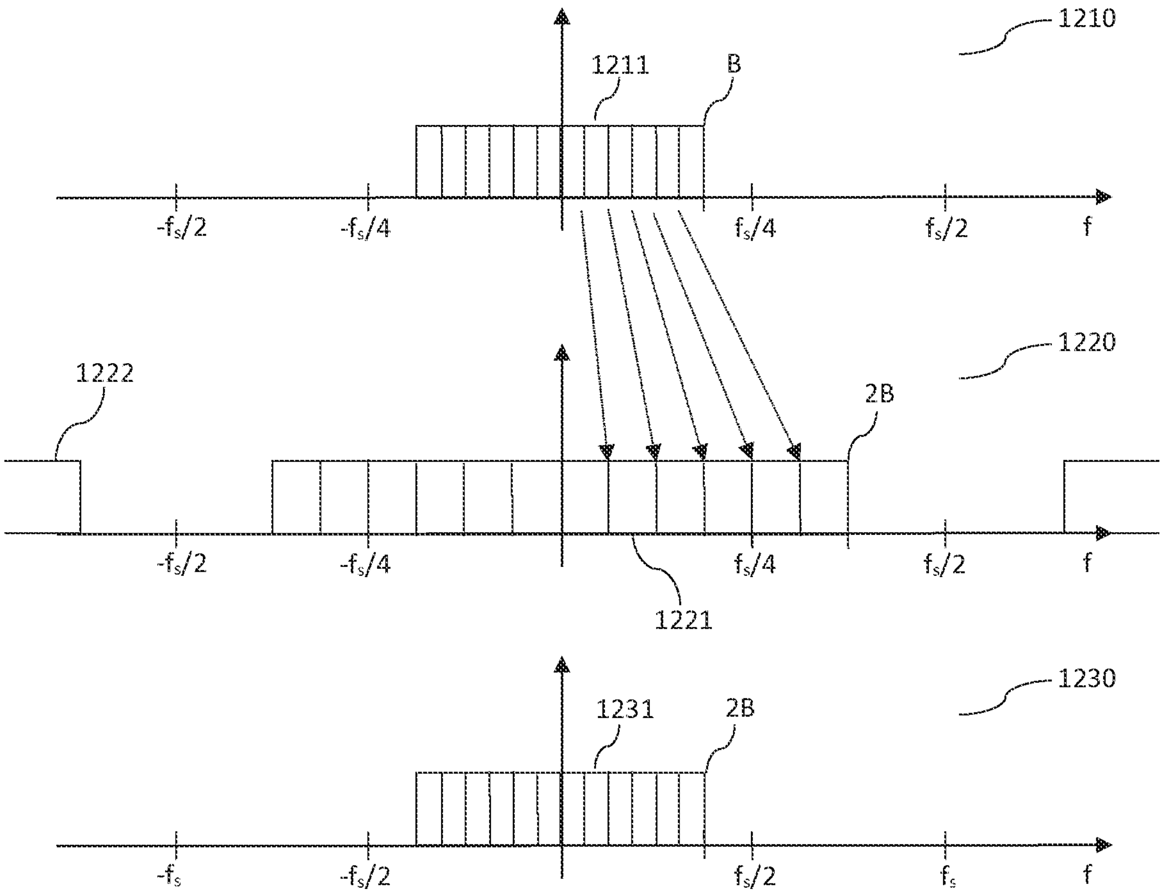
FIG. 12*a* illustrates example effects of harmonic transposition on a signal in the frequency domain.

The impact of transposition by an order T=2 on a signal at a sampling frequency fs is shown in the frequency diagrams illustrated in FIG. 12*a*. The frequency diagram 1210 shows an input signal to the transposer 602-2 with a bandwidth B Hz. The input signal is segmented into analysis subband signals using an analysis filter bank. This is represented by the segmentation into frequency bands 1211. The analysis subband signals are transposed to a T=2 times higher frequency range and the sampling frequency is doubled. The resulting frequency domain signal is illustrated in frequency diagram 1220, wherein frequency diagram 1220 has the same frequency scale as frequency diagram 1210. It can be seen that the subbands 1211 have been transposed to the subbands 1221. The transposition operation is illustrated by the dotted arrows. Furthermore, the periodic spectrum 1222 of the transposed subband signals is illustrated in the frequency diagram 1220. Alternatively, the process of transposition can be illustrated as in frequency diagram 1230, where the frequency axis has been scaled, i.e. multiplied by the transposition factor T=2. In other words, the frequency diagram 1230 corresponds to the frequency diagram 1220 at a T=2 time higher scale. The subband segments 1231 each have bandwidths twice that of the segments 1211. This results in an output signal of the transposer 602-2 which has a T=2 times higher sampling rate than the input signal, i.e. a sampling rate of 2 fs, while the time duration of the signal remains unchanged As can be seen in FIG. 6 and as has been outlined above, the output signal of the individual transposer 602-2 with transposition order T=2 has a sampling frequency of 2 fs. In order to generate QMF subband signals at a sampling frequency fs/32, an analysis QMF bank 603-2 having 64 channels should be used. In a similar manner, the output signal of the individual transposer 602-P with transposition order T=P has a sampling frequency of Pfs. In order to generate QMF subband signals at a sampling frequency fs/32, an analysis QMF bank 603-2 having 32. P channels should be used. In other words, the subband outputs from all the instances of the analysis QMF banks 603-1, . . . , 603-P will have equal sampling frequencies if the size, i.e. the number of channels for each of the analysis QMF banks 603-1, . . . , 603-P is adapted to the signal originating from the corresponding transposer 602-2, . . . , 602-P. The sets of QMF subband signals at the sampling frequency fs/32 are fed to the HFR processing module 604, where the spectral adjustment of the high frequency components is performed according to the transmitted side information. Finally the adjusted subband signals are synthesized to a time domain signal by a 64 channel inverse or synthesis QMF bank 605, thereby effectively producing a decoded output signal at sampling frequency 2 fs from the QMF subband signals sampled at fs/32.

As has been outlined above, the transposer modules 602-2, . . . , 602-P produce time domain signals of different sampling rates, i.e. sampling rates 2 fs, . . . , Pfs, respectively. The resampling of the output signals of the transposer modules 602-2, . . . , 602-P is achieved by "inserting" or discarding subband channels in the following corresponding QMF analysis banks 603-1, . . . , 603-P. In other words, the resampling of the output signals of the transposer modules 602-2, . . . , 602-P may be achieved by using a different number of QMF subbands in the subsequent respective analysis QMF banks 603-1, . . . , 603-P and the synthesis QMF bank 605. Hence, the output QMF subband signals from the QMF banks 602-2, . . . , 602-P may need to be fitted into the 64 channels finally being transmitted to the synthesis QMF bank 605. This fitting or mapping may be achieved by mapping or adding the 32 QMF subband signals coming from the 32 channel analysis QMF bank 603-1 to the first 32 channels, i.e. the 32 lower frequency channels, of the synthesis or inverse QMF bank 605. This effectively results in a signal which is filtered by the analysis QMF bank 603-1 to be upsampled by a factor 2. All the subband signals coming from the 64 channel analysis QMF bank 603-2 may be mapped or added directly to the 64 channels of the inverse QMF bank 605. In view of the fact that the analysis QMF bank 603-2 is of exactly the same size as the synthesis QMF bank 605, the respective transposed signal will not be resampled. The QMF banks 603-3, . . . , 603-P have a number of output QMF subband signals which exceeds 64 subband signals. In such cases, the lower 64 channels may be mapped to or added to the 64 channels of the synthesis QMF bank 605. The upper remaining channels may be discarded. As an outcome of the use of a 32. P channel analysis QMF bank 603-P, the signal which is filtered by QMF bank 603-P will be downsampled a factor P/2. Consequently, this resampling depending on the transposition order P will result in all transposed signals having the same sampling frequency.

Figure 12B:
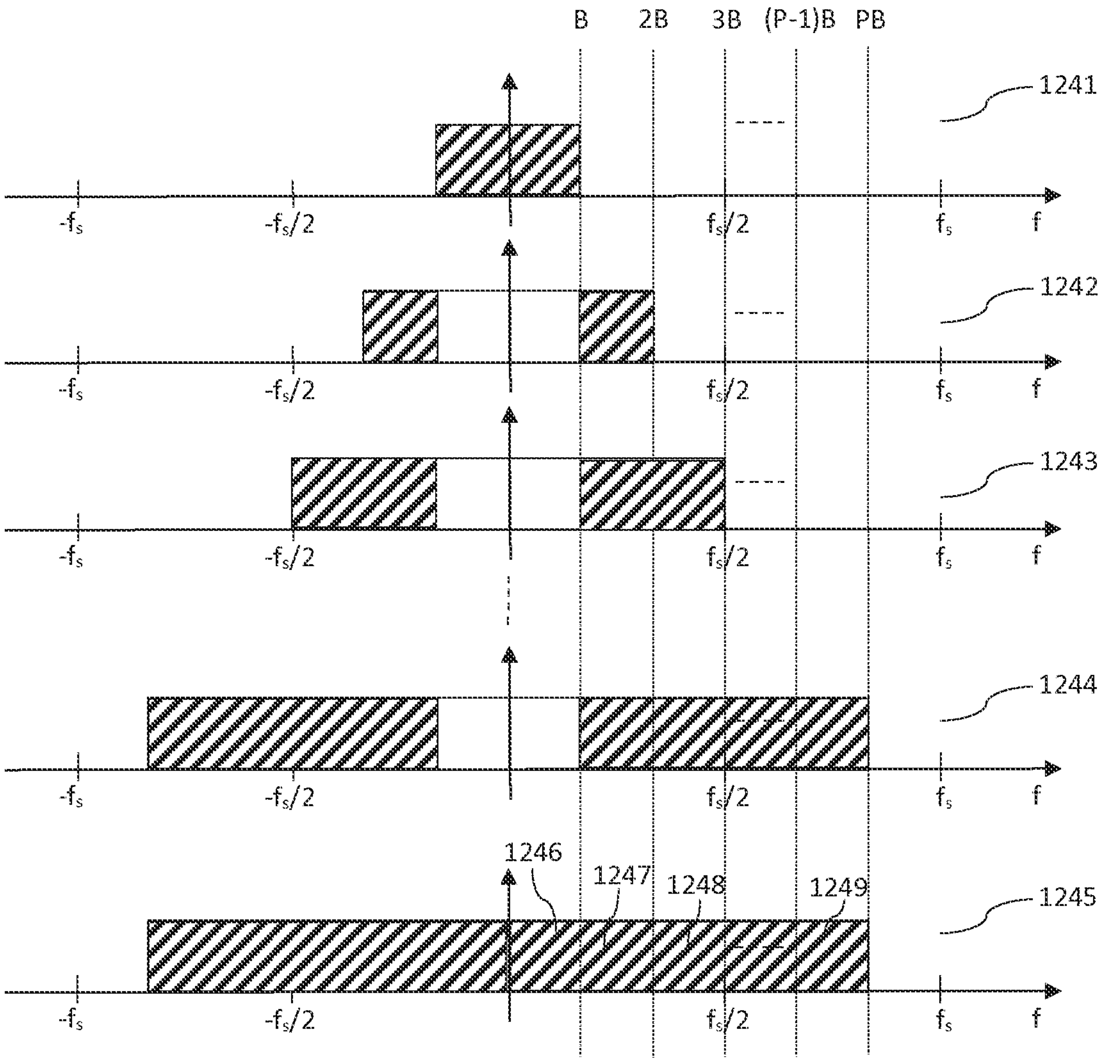
FIGS. 12*b* and 12*c* illustrate example methods for combining overlapping and non-overlapping transposed signals.
Figure 12C:
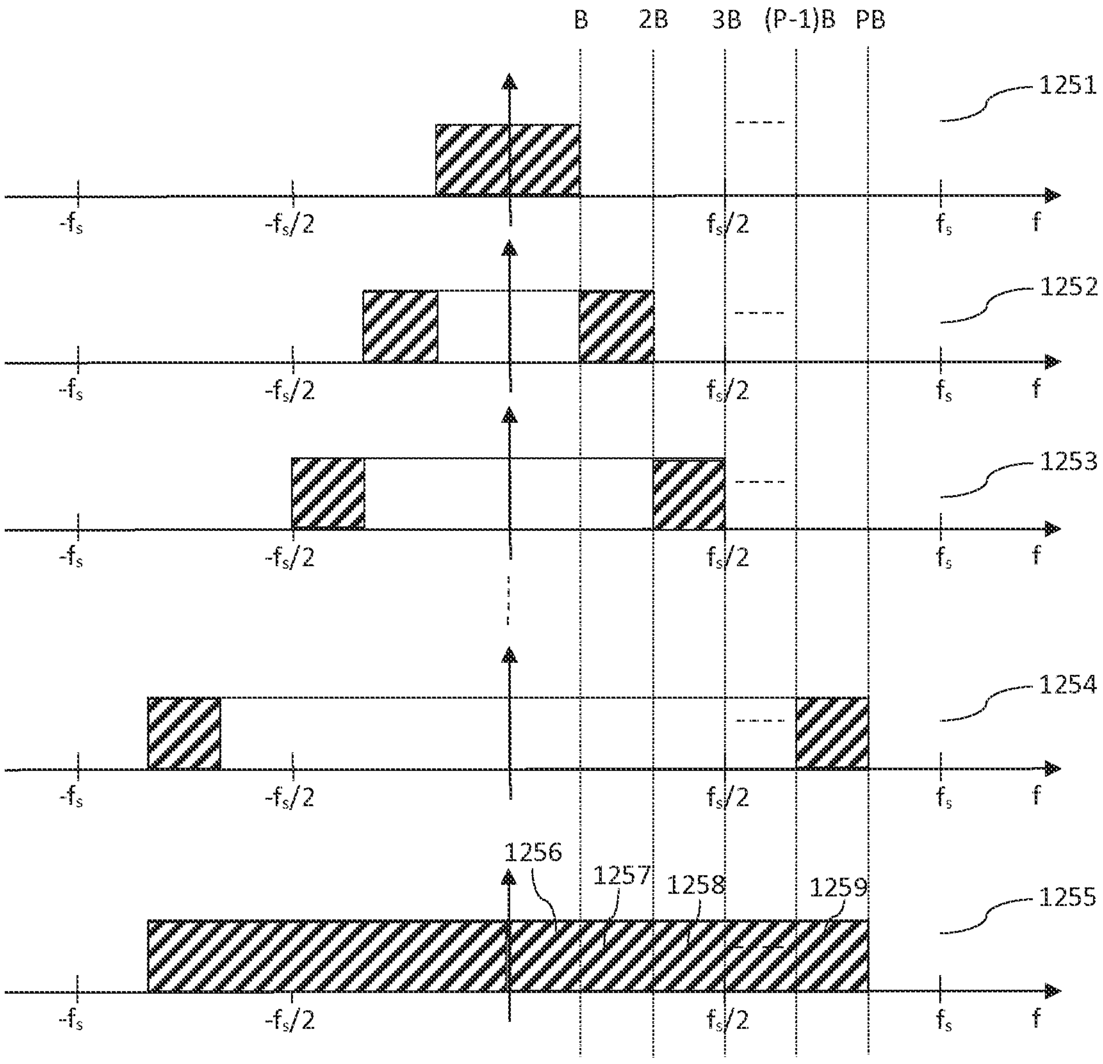

In other words, it is desirable that the subband signals have the same sampling rates when fed to the HFR processing module 604, even though the transposer modules 602-2, . . . , 602-P produce time domain signals of different sampling rates. This may be achieved by using different sizes of the analysis QMF banks 603-3, . . . , 603-P, where the size typically is 32T, with T being the transposition factor or transposition order. Since the HFR processing module 604 and the synthesis QMF bank 605 typically operate on 64 subband signals, i.e. twice the size of analysis QMF bank 603-1, all subband signals from the analysis QMF banks 603-3, . . . , 603-P with subband indices exceeding this number may be discarded. This can be done since the output signals of the transposers 602-2, . . . , 602-P may actually cover frequency ranges above the Nyqvist frequency fs of the output signal. The remaining subband signals, i.e. the subband signals that have been mapped to the subbands of the synthesis QMF bank 605, may be added to generate frequency overlapping transposed signals (see FIG. 12 *b* discussed below) or combined in some other way, e.g. to obtain non-overlapping transposed signals as depicted in FIG. 12*c* (discussed below). In case of non-overlapping transposed signals, a transposer 602-T of transposition order T, wherein T=2, . . . , P, is typically assigned a particular frequency range for which the transposer 602-T exclusively generates a frequency component. In an embodiment, the dedicated frequency range of the transposer 602-T may be [(T−1)B,TB] where B is the bandwidth of the input signal to the transposer 602-T. In such cases, synthesis subband signals of the transposer 602-T which are outside the dedicated frequency range are ignored or discarded. On the other hand, a transposer 602-T may generate frequency components which overlap with frequency components of other transposers 602-2, . . . , 602-P. In such cases, these overlapping frequency components are superposed in the QMF subband domain.

As indicated above, in typical embodiments, a plurality of transposers 602-2, . . . , 602-P are used to generate the high frequency component of the output signal of the HFR module 600. It is assumed that the input signal to the transposers 602-2, . . . , 602-P, i.e. the low frequency component of the output signal, has a bandwidth of B Hz and a sampling rate fs and the output signal of the HRF module 600 has a sampling rate 2 fs. Consequently, the high frequency component may cover the frequency range [B,fs]. Each of the transposers 602-2, . . . , 602-P may provide a contribution to the high frequency component, wherein the contributions may be overlapping and/or non-overlapping. FIG. 12*b* illustrates the case, where the high frequency component is generated from overlapping contributions of the different transposers 602-2, . . . , 602-P. The frequency diagram 1241 illustrates the low frequency component, i.e. the input signal to the transposers 602-2, . . . , 602-P. Frequency diagram 1242 illustrates the output signal of the $2^{nd}$ order transposer 602-2 comprising subbands in the frequency range [B,2B] which is indicated by the hatched frequency range. The frequency range [0,B] generated by the transposer is typically ignored or discarded, since this range is covered by the low frequency input signal. This is indicated by the white frequency range. Frequency diagram 1243 illustrates the output signal of the $3^{rd}$ order transposer 602-3 covering the frequency range [B,3B] which is indicated by the hatched frequency range. In a similar manner, the transposer 602-P generates an output signal covering the frequency range [B,PB] shown in frequency diagram 1244. Eventually, the output signals of the different transposers 602-2, . . . , 602-P and the low frequency component are mapped to the QMF subbands using analysis QMF banks 603-1, . . . , 603-P, thereby generating P sets of QMF subbands. As can be seen in frequency diagram 1245, the QMF subbands covering the frequency range [0,B], reference sign 1246, receive a contribution only from the low frequency component, i.e. from the signal obtained from $1^{st}$ order transposition. The QMF subbands covering the frequency range [B,2B], reference sign 1247, receive a contribution from the output signals of the transposers of order T=2, . . . , P. The QMF subbands covering the frequency range [2B,3B], reference sign 1248, receive a contribution from the output signals of the transposers of order T=3, . . . , P, and so on. The QMF subbands covering the frequency range [(P−1)B,PB], reference sign 1249, receive a contribution from the output signal of the transposer of order T=P.

FIG. 12*c* illustrates a similar scenario to FIG. 12*b*, however, the transposers 602-2, . . . , 602-P are configured such that the frequency ranges of their output signals do not overlap. Frequency diagram 1251 illustrates the low frequency component. Frequency diagram 1252 illustrates the output signal of the $2^{nd}$ order transposer 602-2 covering the frequency range [B,2B]. Frequency diagram 1253 illustrates the output signal of the $3^{rd}$ order transposer 602-3 covering the frequency range [2B,3B] and frequency diagram 1254 illustrates the output signal of the $P^{th}$ order transposer 602-P covering the frequency range [(P−1)B,PB]. The low frequency component and the output signals of the transposers 602-2, . . . , 602-P are fed to respective analysis QMF banks 603-1, . . . , 603-P which provide P sets of QMF subbands. Typically, these QMF subbands do not comprise contributions in overlapping frequency ranges. This is illustrated in frequency diagram 1255. The QMF subbands covering the frequency range [0,B], reference sign 1256, receive a contribution only from the low frequency component, i.e. from the signal obtained from $1^{st}$ order transposition. The QMF subbands covering the frequency range [B,2B], reference sign 1257, receive a contribution from the output signal of the transposer of order T=2. The QMF subbands covering the frequency range [2B,3B], reference sign 1258, receive a contribution from the output signal of the transposer of order T=3, and so on. The QMF subbands covering the frequency range [(P−1)B,PB], reference sign 1259, receive a contribution from the output signal of the transposer of order T=P.

FIGS. 12*b* and 12*c* illustrate the extreme scenarios of completely overlapping output signals of the transposers 602-2, . . . , 602-P and of completely non-overlapping output signals of the transposers 602-2, . . . , 602-P. It should be noted that mixed scenarios with partly overlapping output signals are possible. Moreover, it should be noted that the two scenarios of FIGS. 12*b* and 12*c* describe systems where the transposers 602-2, . . . , 602-P are configured such that the frequency ranges of their output signals do or do not overlap. This may be achieved by applying windowing in the spectral domain of the transposers, e.g. by setting selected subband signals to zero. An alternative is to let the transposers 602-2, . . . , 602-P, in both scenarios of FIGS. 12*b* and 12*c* generate wideband signals and perform the filtering of the transposed signals in the QMF subband domain by combining the subband signals obtained from the analysis QMF banks 603-1, . . . , 603-P in an appropriate manner. E.g. in the non-overlapping case, only one of the analysis QMF banks 603-1, . . . , 603-P contributes to the subband signals fed to the HFR processor 604 in each transposer output frequency range. For the overlapping case, pluralities of the subband signals are added before entering the HFR processor 604.

A more efficient implementation of the system of FIG. 6 is obtained if some or all of the signals of the HRF system 600 are (close to) critically sampled, as shown in FIG. 7 and FIG. 13 to 16 for the HFR system 700. This means that the output signal of the core decoder 701 and preferably also other intermediate signals of the HRF system 700, e.g. the output signals of the transposers 702-2, . . . , 702-P are critically downsampled. For example, the core decoded signal at the output of the core decoder 701 is downsampled by a rational factor $Q=M_1/M_2$, where $M_1$ and $M_2$ are appropriately chosen integer values. The downsampling factor Q should be the largest factor that forces the input signal of bandwidth B to be close to critically sampled. At the same time, Q should be selected such that the size (32/Q) of the QMF bank 703-1 remains an integer. The downsampling by a rational factor Q is performed in downsampler 706 and yields an output signal at the sampling frequency fs/Q. In order to provide transposed signals which are also critically sampled, the transposers 702-2, . . . , 702-P preferably only output the part of the transposed signal that is relevant, i.e. the frequency range that is actually used by the HFR processor 704. The relevant frequency range for a transposer 702-T of transposition order T may be the range [(T−1)B, TB] for an input signal having a bandwidth B Hz in the non-overlapping case.

This means that the output from the downsampler 706 and the output from the transposers 702-2, . . . , 702-P are critically sampled. The output signal of the $2^{nd}$ order transposer 702-2 would have a sampling frequency fs/Q which is identical to the output signal of the downsampler 706. However, it should be noted that the signal from the $2^{nd}$ order transposer 702-2 is actually a highpass signal with a bandwidth of fs/(2Q) which is modulated to the baseband, since the transposer 702-2 is configured such that it only synthesizes a transposed frequency range from approximately B to 2B Hz.

For transposers of larger order, e.g. transposer 702-P, at least two likely scenarios are possible. The first scenario is that the transposed signals are overlapping, i.e. the lower frequency part of the $P^{th}$ order transposed signal is overlapping with the frequency range of the transposed signal of order P−1 (see FIG. 12*b*). In this case, the output from the critically sampled transposer 702-P has the sampling frequency Sfs/Q, where S=min(P−1, 2Q−1). When S=P−1, the uppermost frequency of the $P^{th}$ order transposed signal is still below the Nyqvist frequency fs of the output signal of the HFR system 700, and when S=2Q−1, the $P^{th}$ order transposed signal is bandwidth limited by the Nyqvist frequency fs of the output signal of the HFR system 700. I.e. the sampling frequency of the output signal of the transposer 702-P is never larger than $$\left(2-\frac{1}{Q}\right)fs,$$

which corresponds to a signal covering the frequency interval from fs/(2Q) (highest frequency of lowband signal) up to the Nyqvist frequency fs. The other scenario is that the transposed signals are non-overlapping. In this case S=1, and all transposed signals have identical sampling frequencies, albeit covering different non-overlapping frequency ranges in the output signal of the inverse QMF bank 705, i.e. in the output signal of the HFR system 700 (see FIG. 12*c*).

Figure 13:
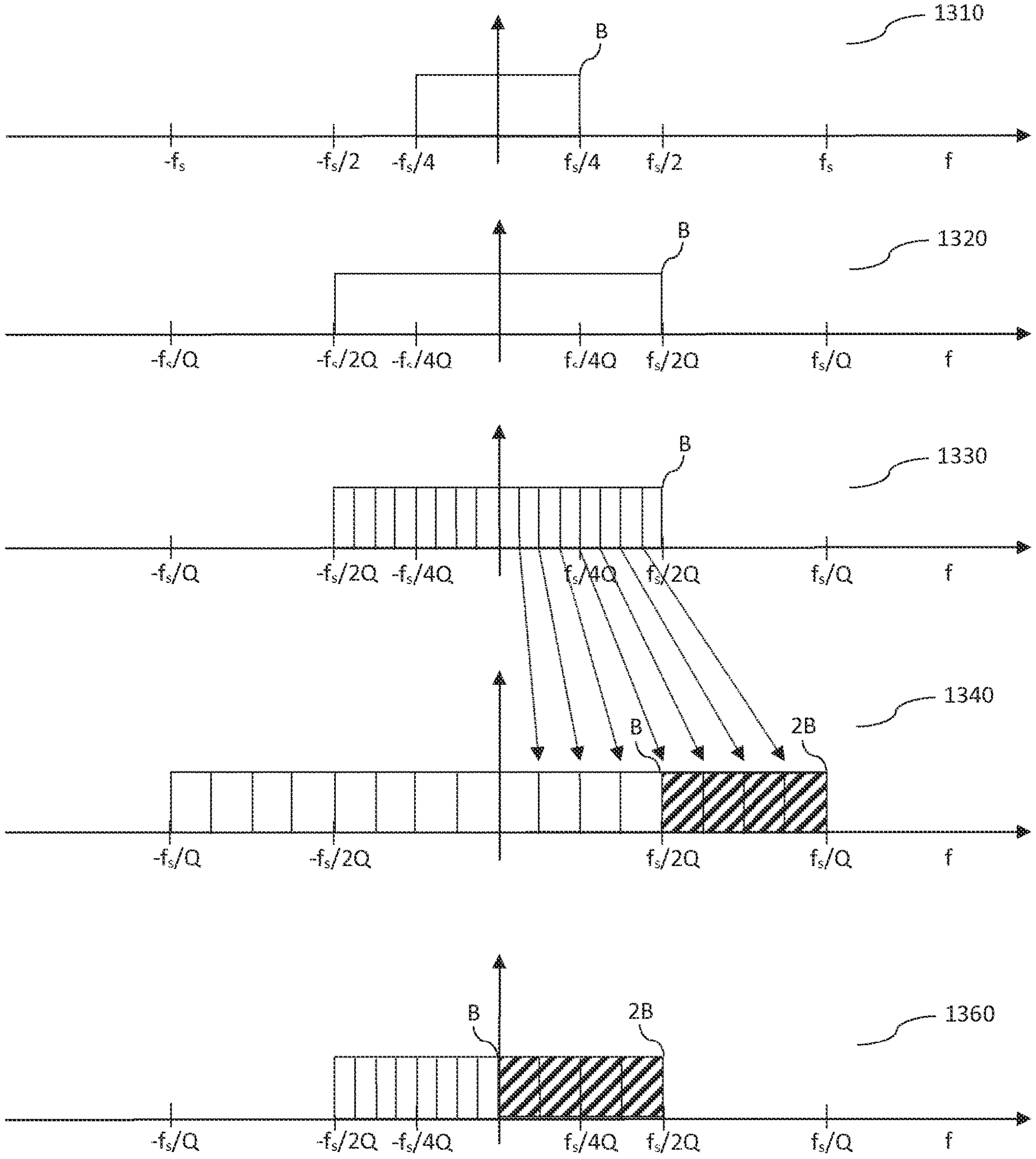
FIG. 13 illustrates example effects of harmonic transposition of order T=2 in combination with subsampling on a signal in the frequency domain.

The effect of the described subsampling or downsampling on an output signal of the core decoder 701 having a bandwidth B Hz is illustrated in FIGS. 13 to 16. FIG. 13 schematically illustrates the transition of the signal from the output of the core decoder 701 to the output of the transposer 702-2 of transposition order T=2. The frequency diagram 1310 shows the output signal of the core decoder 701 with bandwidth B Hz. This signal is critically downsampled in downsampler 706. The downsampling factor Q is a rational value which ensures that the analysis QMF band 703-1 has an integer number 32/Q of subbands. Furthermore, the downsampler 706 should provide a critically sampled output signal, i.e. an output signal having a sampling frequency fs/Q which is as close as possible to two times the bandwidth B of the core decoded signal, i.e.

$$Q<\frac{fs}{2B}.$$

Such a critically sampled signal is illustrated in the frequency diagram 1320. This critically sampled signal with sampling frequency fs/Q is passed to the transposer 702-2 where it is segmented into analysis subbands. Such a segmented signal is illustrated in frequency diagram 1330. Subsequently, nonlinear processing is performed on the analysis subband signals which results in a stretching of the analysis subbands to T=2 times higher frequency ranges and a sampling frequency 2 fs/Q. This is illustrated in frequency diagram 1340, which alternatively may be viewed as the frequency diagram 1330 with scaled frequency axis. It should be noted that only a subset of the transposed subbands will typically be considered in the HFR processing module 704. These relevant transposed subbands are indicated in frequency diagram 1340 as the hatched subbands which cover the frequency range [B,2B]. Only the hatched subbands may need to be considered in the transposer synthesis filter bank, and hence the relevant range can be modulated down to the baseband and the signal may be downsampled by a factor 2 to a sampling frequency offs/Q. This is illustrated in frequency diagram 1360, where it can be seen that the signal covering a frequency range [B,2B] has been modulated into the baseband range [0,B]. The fact that the modulated signal actually covers the higher frequency range [B,2B] is illustrated by the reference signs "B" and "2B".

It should be noted that the illustrated steps of transposition (shown in frequency diagram 1340) and the subsequent modulation into the baseband (shown in frequency diagram 1360) are only shown for illustrative purposes. Both operations may be performed by assigning the hatched subbands (shown in frequency diagram 1340) to the synthesis subbands of a synthesis filter bank having half the number of subbands as the analysis filter bank. As an outcome of such mapping operation, the output signal shown in frequency diagram 1360, which is modulated into the baseband, i.e. which is centered around the zero frequency, may be obtained. In the non-overlapping scenario, the synthesis filter bank size is reduced with respect to the analysis filter bank in order to enable the achievable downsampling factor which is given by the ratio between the full frequency range [0,PB] which may be covered by the output signal of a $P^{th}$ order transposer 703-P and the actual frequency range [(P−1)B, PB] covered by the output signal of the $P^{th}$ order transposer 703-P, i.e. the factor P.

Figure 14:
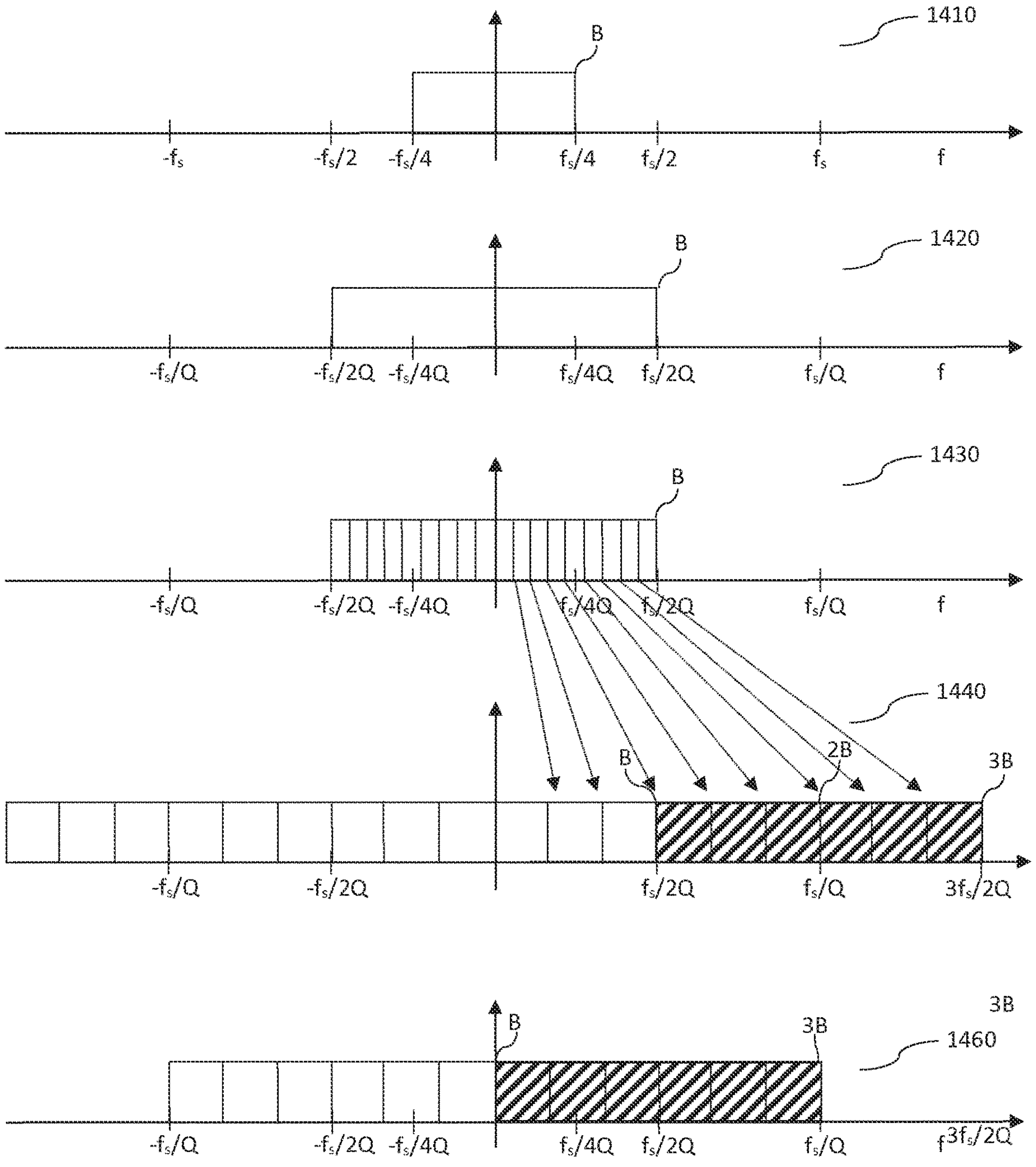
FIG. 14 illustrates example effects of harmonic transposition of order T=3 in combination with subsampling on a signal in the frequency domain.

FIG. 14 schematically illustrates the transition of the signal from the output of the core decoder 701 to the output of the transposer 702-3 of transposition order T=3 in the scenario of overlapping frequency ranges. The signal with bandwidth B shown in frequency diagram 1410 is downsampled by a factor Q in downsampler 706 to yield the signal shown in frequency diagram 1420. The analysis subbands shown in frequency diagram 1430 are transposed to subbands with T=3 times higher frequencies. The transposed subbands are illustrated in frequency diagram 1440, where the sampling rate is increased from fs/Q to 3 fs/Q. As outlined in the text to FIG. 13, this can be viewed as a scale change of the frequency axis by a factor 3. It can be seen that the frequency range of the $3^{rd}$ order transposer 702-3, i.e. the hatched frequency range [B,3B], overlaps with the frequency range of the $2^{nd}$ order transposer 702-2. In a similar manner to FIG. 13, the hatched subbands may be fed into a synthesis filter bank of a reduced size, thereby yielding a signal comprising only frequencies from the hatched subbands. This highpass signal is thus modulated down to the baseband using a downsampling factor 3/2. The resulting critically sampled output signal of the transposer 703-2 having a sampling frequency 2 fs/Q is illustrated in frequency diagram 1460.

In a similar manner to FIG. 13, it should be noted that the transposition operation shown in frequency diagram 1440 and the modulation into the baseband shown in frequency diagram 1460 is performed by mapping the hatched subbands of frequency diagram 1440 to the synthesis subbands of a synthesis filter bank of reduced size In the overlapping scenario, the synthesis filter bank size is reduced with respect to the analysis filter bank in order to enable the achievable downsampling factor which is given by the ratio between the full frequency range [0,PB] which may be covered by the output signal of the $P^{th}$ order transposer 703-P and the actual frequency range [B, PB] covered by the output signal of the $P^{th}$ order transposer 703-P, i.e. the factor P/(P−1).

Figure 15:
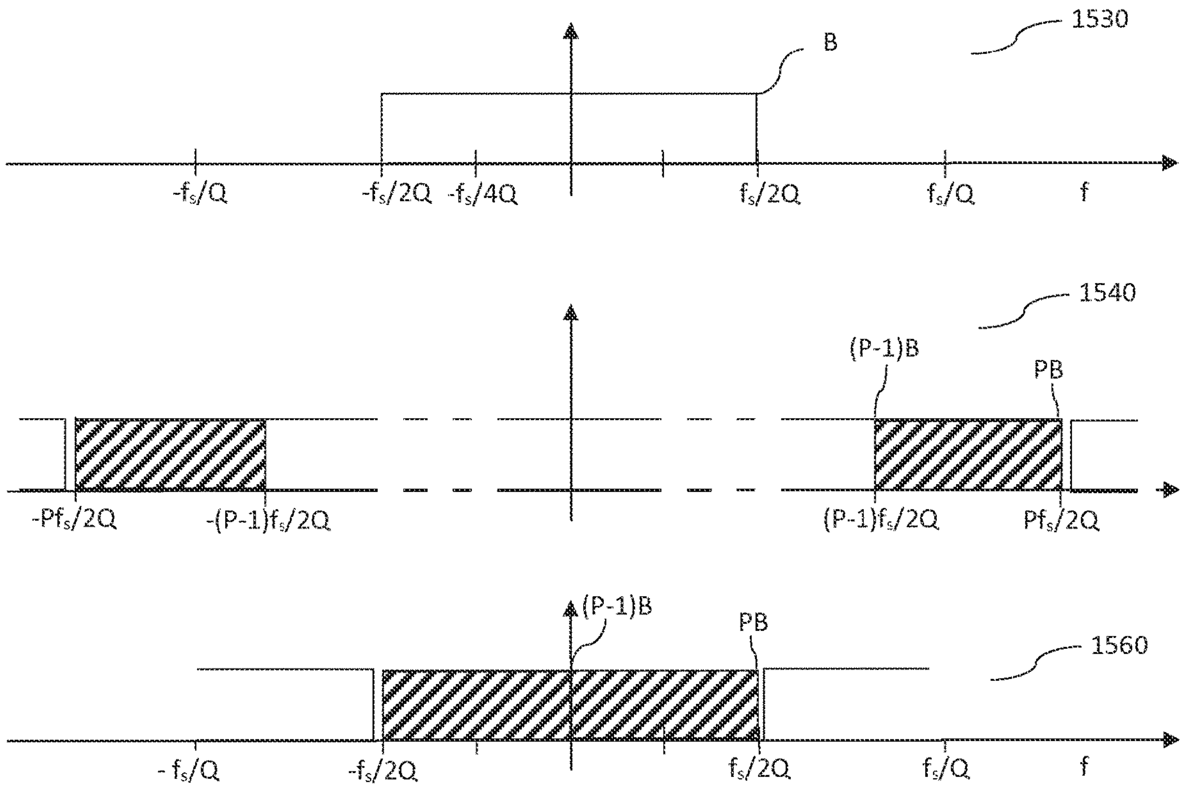
FIG. 15 illustrates example effects of harmonic transposition of order T=P in combination with subsampling on a signal in the frequency domain (non-overlapping case)

FIG. 15 schematically illustrates the transition of the signal from the output of the downsampler 706 to the output of the transposer 702-P of transposition order T=P for the case that the transposed frequency range is not overlapping with the relevant frequency range of the lower order transposer T=P−1, i.e. [(P−2)B,(P−1)B]. As outlined in the context with FIG. 13 the downsampled signal shown in frequency diagram 1530 is transposed by transposer 702-P. The transposed subbands covering the relevant frequency range [(P−1)B,PB] are illustrated in frequency diagram 1540 as the hatched frequency range. The subbands corresponding to the hatched frequency range are fed into the synthesis filter bank of reduced size, thereby generating a signal comprising only frequencies in the range [(P−1)B,PB]. Consequently, this highpass signal is modulated into the baseband and downsampled using a factor P. As a result, the critically sampled output signal of the transposer 702-P shown in frequency diagram 1560 is obtained. This output signal of the transposer 702-P comprises frequency components of the frequency range [(P−1)B,PB]. This has to be considered when mapping the transposer output to QMF subbands for HFR processing.

Figure 16:
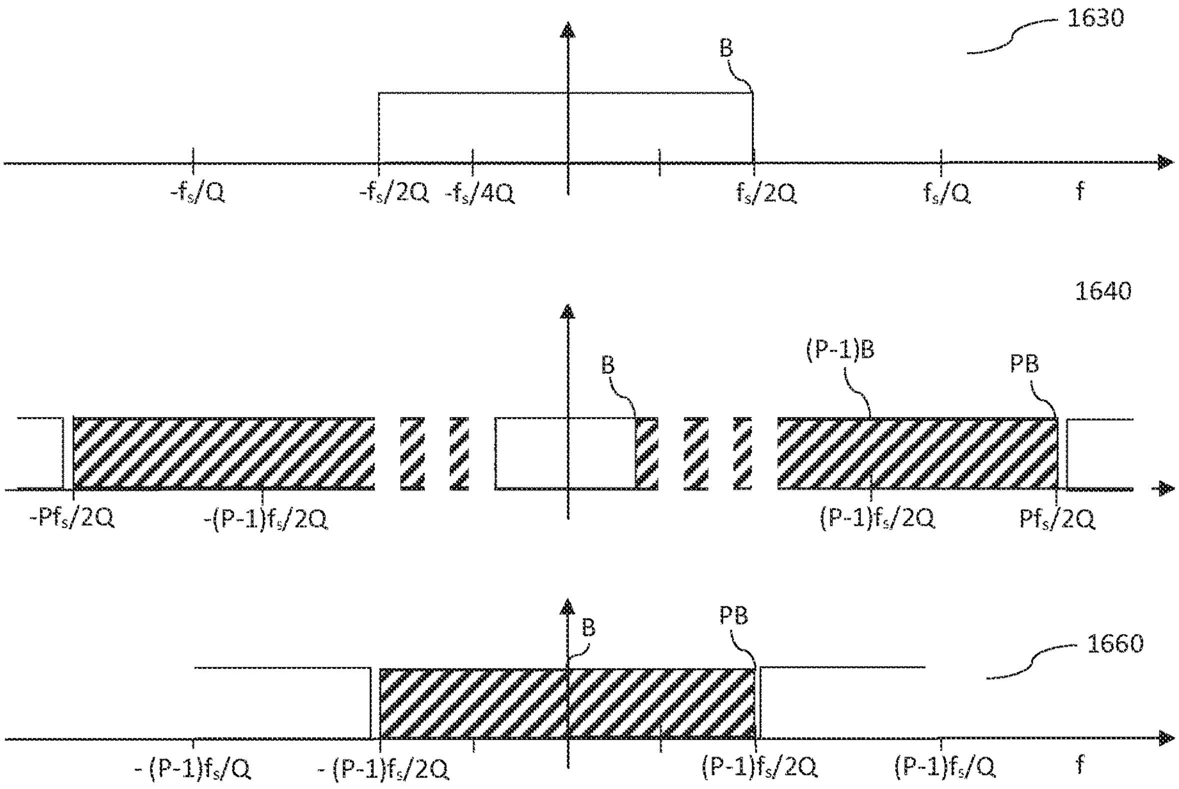
FIG. 16 illustrates example effects of harmonic transposition of order T=P in combination with subsampling on a signal in the frequency domain (overlapping case)

FIG. 16 schematically illustrates the transition of the signal from the output of the downsampler 706 to the output of the transposer 702-P of transposition order T=P for the case that the transposed frequency range is overlapping with the relevant frequency range of the lower order transposers T=2, . . . , P−1, i.e. [B,(P−1)B]. As outlined in the context with FIG. 14 the downsampled signal shown in frequency diagram 1630 is transposed in transposer 702-P. The transposed subbands covering the frequency range [B,PB] are illustrated in frequency diagram 1640 as the hatched frequency range. In a similar manner to FIG. 14, it can be seen that the hatched subbands cover frequencies below (P−1)B. Consequently, the hatched subbands overlap with the frequency ranges of the lower order transposers 702-2, . . . , 702-P−1. Furthermore, due to the fact that the hatched subbands cover a range larger than [(P−1)B,PB], only a reduced downsampling factor can be used. As outlined above, this downsampling factor is P/(P−1) if the frequency range covered by the output signal of the $P^{th}$ order transposer 702-P is [B,(P−1)B]. As a result, a downsampled output signal of the transposer 702-P having a sampling frequency (P−1)fs/Q is obtained.

Figure 7:
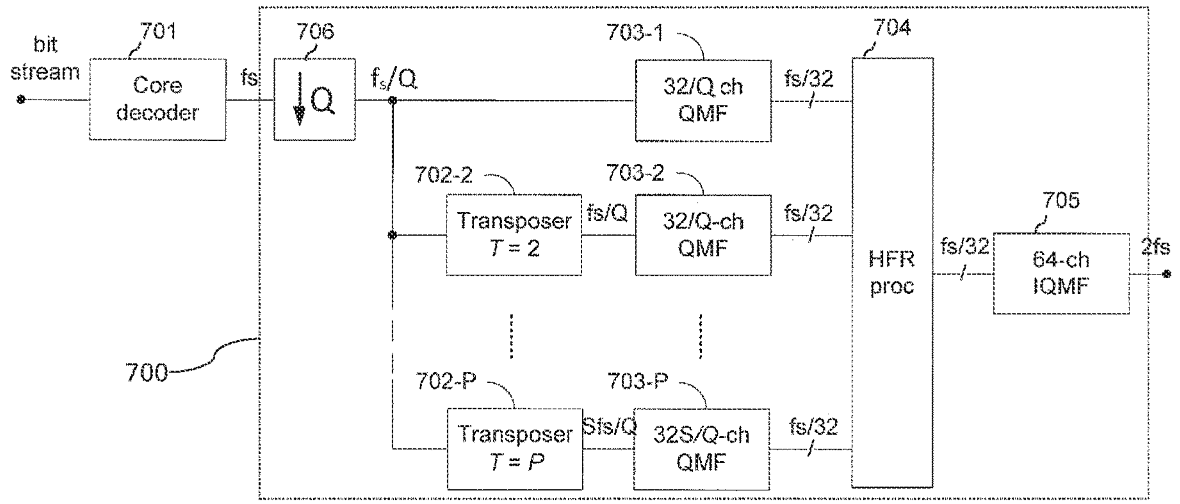
FIG. 7 illustrates an example implementation of the scenario of FIG. 6 involving subsampling.

As already indicated above, it should be noted that the intermediate signals within the transposer 706-P, i.e. notably the signals shown in the frequency diagrams 1340, 1440, 1540, 1640 are not physical signals present in the HFR system shown in FIG. 7. These signals have been shown for illustrative purposes and can be viewed as "virtual" signals within the transposer 706-P, showing the effect of transposition and filtering in the presence of implicit downsampling.

It should be noted that in the example outlined above, the output signal from the core decoder 701 may possibly already be critically sampled with the sampling rate fs/Q when entering the HFR module 700. This can be accomplished, e.g., by using a smaller synthesis transform size than the nominal size in the core decoder 701. In this scenario, computational complexity is decreased because of the smaller synthesis transform used in the core decoder 701 and because of the obsolete downsampler 706.

Figure 8:
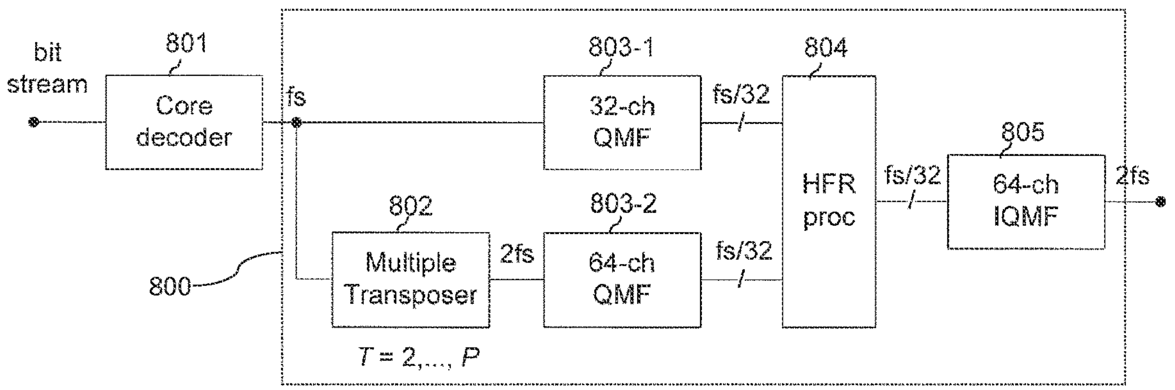
FIG. 8 illustrates a second exemplary scenario for the application of harmonic transposition using several orders of transposition in a HFR enhanced audio codec.

Another measure for improving the efficiency of an HFR system, is to combine the individual transposers 602-2, . . . , 602-P of FIG. 6 according to one of the schemes outlined in the context of FIG. 3, 4 or 5. As an example, instead of using individual transposers 602-2, . . . , 602-P for the different transposition orders T=2, . . . , P, a multiple transposer system 300, 400 or 500 may be used. A possible scenario is illustrated in FIG. 8, where the transposers for transposition factors T equal or larger than two are grouped together to a multiple transposer 802, which may be implemented according to any of the aspects outlined in relation to FIGS. 3 to 5. In the illustrated example, the output from the multiple transposer 802 has a sampling frequency 2 fs, i.e. a sampling frequency which is two times higher than the sampling frequency of the input signal to the multiple transposer 802. The output signal of the multiple transposer 802 is filtered by a single analysis QMF bank 803-2 having 64 channels.

As outlined in the context of FIG. 6, the resampling of the core signal, i.e. the resampling of the output signal of the core decoder 801, may be achieved by filtering the signal using a downsampled QMF bank 803-1 having only 32 channels. As a consequence, both sets of QMF subband signals have QMF subband signals with a sampling frequency fs/32. The two sets of QMF subband signals are fed to the HFR processing module 804 and finally the adjusted QMF subband signals are synthesized to a time domain signal by the 64 synthesis QMF bank 805. It should be noted that in the illustrated scenario the multiple transposer 802 produces a transposed time domain signal of twice the sampling rate fs. As outlined in the context of FIGS. 3, 4 and 5, this transposed time domain signal is the sum of several transposed signals of different transposition factors T, where T is an integer greater than 1. The reason for the fact that the multiple transposer 802 provides an output signals with a sampling frequency 2 fs is that the output signal of the multiple transposer 802 covers the high frequency range of the output signal of the HFR module 800, i.e. at most the range [B,fs], wherein B is the bandwidth of the low frequency component and fs is the Nyqvist frequency of the output signal of the HRF module 800.

Figure 9:
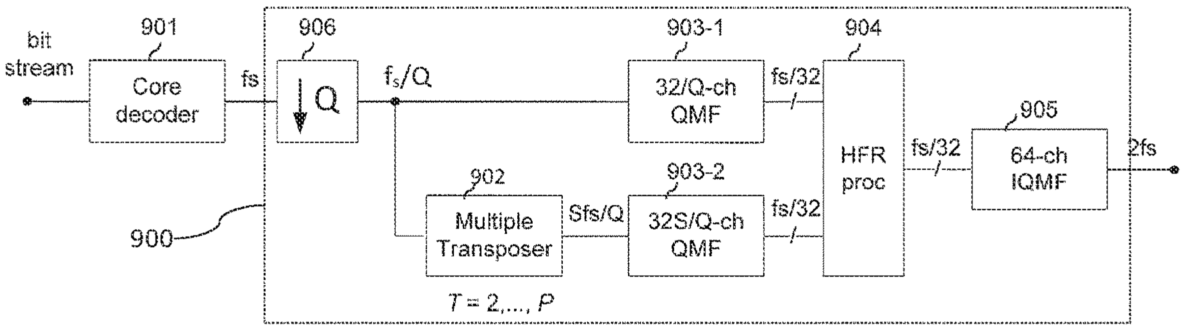
FIG. 9 illustrates an exemplary implementation of the scenario of FIG. 8 involving subsampling.

As outlined in the context of FIG. 7, the efficiency of the HFR system 800 may be increased further by increasing the level of subsampling of the time domain signals, i.e. by providing critically downsampled signals, preferably at the output of the core decoder and at the output of the transposer. This is illustrated in FIG. 9, where the insights outlined in the context of FIG. 7 and FIGS. 13 to 16 may be applied. The output signal of the core decoder 901 is downsampled in the downsampling unit 906, yielding a downsampled signal at a sampling frequency fs/Q. This signal is fed to the multiple transposer 902 and to the analysis QMF bank 903-1. The output of the multiple transposer 902 has the sampling frequency Sfs/Q, where S=min(P−1, 2Q−1), since the output from the multiple transposer 902 is a combination of signals with transposition orders from T=2 to P. The transposed signal is fed into an analysis QMF bank 903-2 of size 32S/Q. In a similar manner as outlined above, the two sets of QMF subband signals are processed in the HFR processor 904 and eventually converted into a time domain signal using the synthesis QMF bank 905.

Figure 10:
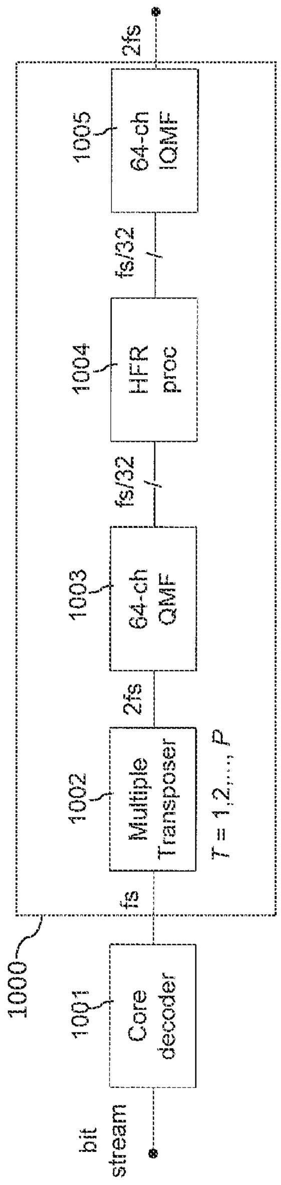
FIG. 10 illustrates a third exemplary scenario for the application of harmonic transposition using several orders of transposition in a HFR enhanced audio codec.

In embodiments, the QMF bank analyzing the core coder signal, i.e. the analysis QMF bank 803-1 of FIG. 8, may be omitted if the multiple transposer is also configured to pass through an unaltered copy of the core signal, i.e. an unaltered copy of the output signal of the core decoder. In transposer terminology this is equivalent to a transposition using the transposition factor T=1, i.e. a $1^{st}$ order transposition. If a $1^{st}$ order transposition is added to the multiple transposer system 802 of FIG. 8, a block diagram of the modified HFR module 1000 may be depicted as shown in FIG. 10. As shown in FIG. 10, the signal decoded by the core decoder 1001 is merely used as input to the multiple transposer 1002, i.e. the signal decoded by the core decoder 1001 is not passed to any additional component of the HFR module 1000. The multiple transposer 1002 is configured such that its single output signal has a sampling frequency 2 fs. In other words, the multiple transposer 1002 produces a time domain signal of twice the sampling rate, wherein the time domain signal is the sum of several transposed signals of different transposition factors T, where T takes the values of 1 to P. This single output signal from the multiple transposer 1002 is analyzed by a 64 channel QMF bank 1003, and the QMF subband signals are subsequently fed into the HFR processing module 1004 which adjusts the QMF subband signals using the transmitted side information. The adjusted QMF subband signals are finally synthesized by the 64 channel synthesis QMF bank 1005.

Figure 11:
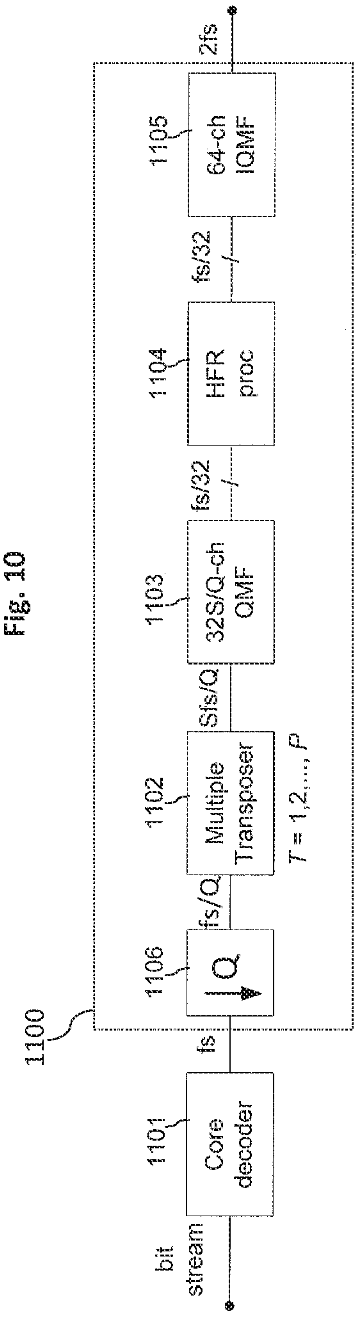
FIG. 11 illustrates an exemplary implementation of the scenario of FIG. 10 involving subsampling.

In a similar manner to the downsampling described in the context of FIGS. 7 and 9, the efficiency of the HFR module 1000 may be increased by means of subsampling of the time domain signals. Such an HFR module 1100 is shown in FIG. 11. A received bit stream is decoded by the core decoder 1101 which provides a time domain output signal at sampling frequency fs. This time domain output signal is downsampled by a factor Q using the downsampling unit 1106. The downsampled signal at sampling frequency fs/Q is passed to the multiple transposer 1102. The output from the multiple transposer 1102 will have the sampling frequency Sfs/Q. This time, however, the parameter S is selected as S=min(P, 2Q) since the transposed signal also comprises the decoded and downsampled output signal of the core decoder 1101. The output signal of the multiple transposer 1102 is segmented into QMF subband signals using an analysis QMF bank 1103 having 32S/Q channels. The QMF subband signals are adjusted using the transmitted side information and subsequently merged by a synthesis 64 channel QMF bank 1105.

As mentioned above, the multiple transposers 802, 902, 1002, and 1102 illustrated in FIGS. 8 to 11 may be based on any of the configurations presented in the context of FIGS. 3 to 5. In addition, the transposer configuration illustrated in FIG. 2 may be used, albeit its inferior computational efficiency compared to the multiple transposer designs of FIG. 3 to 5. In a first preferred embodiment, the HFR module configurations illustrated in FIGS. 10 and 11 are used in combination with the multiple transposer described in the context of FIG. 5. An exemplary mapping of the transposer analysis subbands to the transposer synthesis subbands is illustrated in FIG. 5*b*. In a second preferred embodiment, the HFR module configurations illustrated in FIGS. 8 and 9 are used in combination with the multiple transposer described in the context of FIG. 5. An exemplary mapping of the transposer analysis subbands to the transposer synthesis subbands is in this embodiment illustrated in FIG. 5*c*.

Figure 17:
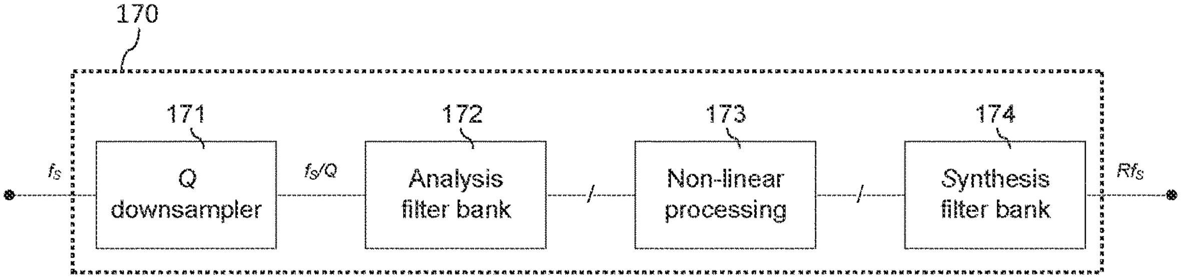
FIG. 17 illustrates an example layout of a maximally decimated, i.e. critically sampled, transposer building block.

With the examples outlined in the context of FIGS. 7, 9, 11, and 13-16, a general building block of a maximally decimated, or critically sampled, transposer may be identified. Such a building block 170 is illustrated in FIG. 17. An input signal of sampling frequency fs is first processed in the factor Q downsampler 171, and filtered through a transposer analysis filter bank 172. The analysis filter bank has a filter bank size, or transform size, of $N_a$, and a hopsize, or input signal stride, of $\delta_a$ samples. The subband signals are subsequently processed by a non-linear processing unit 173, using the transposition factor T. The non-linear processing unit 173 may implement any of the non-linear processing outlined in the present document. In an embodiment, the non-linear processing outlined in the context of FIGS. 5, 5*b*, 5*c* may be performed in the non-linear processing unit 173. Finally, the subband signals are assembled to a time domain signal of sampling frequency $Rf_s$ in a transposer synthesis filter bank 174, wherein R is a desired re-sampling factor. The synthesis filter bank has a filter bank size, or transform size, of $N_s$, and a hopsize, or output signal stride, of $\delta_s$ samples. The expansion factor W comprising the analysis filter bank 172, the non-linear processing unit 173 and the synthesis filter bank 174 is the ratio of the sampling frequencies of the output signal from the synthesis filter bank and the input signal to the analysis filter bank as $$W = \frac{Rf_s}{f_s / Q} = RQ. \tag{6}$$

The filter bank, or transform sizes, $N_a$ and $N_s$ may be related as $$N_s = \frac{W}{T} N_a, \tag{7}$$

and the hopsizes, or signal strides, $\delta_a$ and $\delta_s$ may be related as $$\delta_s = W\delta_a. \tag{8}$$

The maximally decimated, or critically sampled, transposer building block 170 may have either the input signal to the analysis filter bank 172, or the output from the synthesis filter bank 174, or both, covering exclusively the spectral bandwidth relevant for the subsequent processing, such as the HFR processing unit 704 of FIG. 7. The critical sampling of the input signal may be obtained by filtering and possibly modulation followed by decimation of the input signal in the downsampler 171. In an embodiment, the critical sampling of the output signal may be realized by mapping subband signals to a synthesis filter bank 174 of a minimal size adequate to cover exclusively the subband channels relevant for the subsequent processing, e.g. as indicated by equation (7). FIGS. 13-16 illustrate the condition when the output from the synthesis filter bank covers exclusively the relevant spectral bandwidth and thus is maximally decimated.

A plurality of the building blocks 170 may be combined and configured such that a critically sampled transposer system of several transposition orders is obtained. In such a system, one or more of the modules 171-174 of the building block 170 may be shared between the building blocks using different transposition orders. Typically, a system using a common analysis filter bank 301, as outlined in the context of FIG. 3, may have maximally decimated output signals from the synthesis filter banks 303-1, . . . , 303-P, while the input signal to the common analysis filter bank 301 may be maximally decimated with respect to the transposer building block 170 requiring the largest input signal bandwidth. A system using a common synthesis filter bank 404, as outlined in the context of FIG. 4, may have maximally decimated input signals to the analysis filter banks 401-1, . . . , 401-P, and may also have a maximally decimated output signal from the common synthesis filter bank 404. The system outlined in the context of FIG. 2, preferably has both maximally decimated input signals to the analysis filter banks and maximally decimated output signals from the synthesis filter banks. In this case, the structure of the system may be merely a plurality of the transposer building blocks 170 in parallel. A system using both a common analysis filter bank 501 and a common synthesis filter bank 504, as outlined in the context of FIG. 5, typically has a maximally decimated output signal from the common synthesis filter bank 504, while the input signal to the common analysis filter bank 501 may be maximally decimated with respect to the signal in which the transposition order requires the largest input signal bandwidth. For this system, the transposition factor T in equation (7) is replaced by the factor F outlined in the context to FIGS. 5, 5*b* and 5*c*. It should be noted that the summing units 202 of FIG. 2 and 304 of FIG. 3, in the above scenarios may be configured to handle and combine the critically sampled subband signals from the transposer building blocks synthesis filter banks. In an embodiment, the summing units may comprise QMF analysis filter banks followed by means to combine the subband signals or time domain resampling and modulation units followed by means to add the signals.

In the present document, a multiple transposition scheme and system has been described which allows the use of a common analysis filter bank and a common synthesis filter bank. In order to enable the use of a common analysis and synthesis filter bank, an advanced nonlinear processing scheme has been described which involves the mapping from multiple analysis subbands to a synthesis subband. As a result of using a common analysis filter bank and a common synthesis filter bank, the multiple transposition scheme may be implemented at reduced computational complexity compared to conventional transposition schemes. In other words, the computational complexity of harmonic HFR methods is greatly reduced by means of enabling the sharing of an analysis and synthesis filter bank pair for several harmonic transposers, or by one or several harmonic transposers in combination with an upsampler.

Furthermore, various configurations of HFR modules comprising multiple transposition have been described. In particular, configurations of HFR modules at reduced complexity have been described which manipulate critically downsampled signals. The outlined methods and systems may be employed in various decoding devices, e.g. in multimedia receivers, video/audio settop boxes, mobile devices, audio players, video players, etc.

The methods and systems for transposition and/or high frequency reconstruction described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the internet. Typical devices making use of the methods and systems described in the present document are portable electronic devices or other consumer equipment which are used to store and/or render audio signals. The methods and system may also be used on computer systems, e.g. internet web servers, which store and provide audio signals, e.g. music signals, for download.

The invention claimed is:

1. An audio signal processing device comprising one or more processors configured to generate a high frequency component of a signal from a low frequency component of the signal, wherein the one or more processors:

provide a set of analysis subband signals from the low frequency component of the signal; wherein the set of analysis subband signals comprises at least two analysis subband signals;

determine a set of synthesis subband signals from the set of analysis subband signals, such that an $n^{th}$ synthesis subband signal of the set of synthesis subband signals is determined from a $k^{th}$ analysis subband signal and a $(k+1)^{th}$ analysis subband signal of the set of analysis subband signals; wherein a magnitude of the $n^{th}$ synthesis subband signal is determined from a product of an exponentiated magnitude of the $k^{th}$ analysis subband signal and an exponentiated magnitude of the $(k+1)^{th}$ analysis subband signal; wherein a sum of an exponent of the exponentiated magnitude of the $k^{th}$ analysis subband signal and an exponent of the exponentiated magnitude of the $(k+1)^{th}$ analysis subband signal equals one; wherein a phase of the $n^{th}$ synthesis subband signal depends on a transposition order T; and generate the high frequency component of the signal based on the set of synthesis subband signals.

2. The audio signal processing device of claim 1, wherein the one or more processors:

convert an encoded bit stream into the low frequency component of the signal;

convert the high frequency component into a plurality of QMF subband signals;

modify the QMF subband signals; and generate a modified high frequency component from the modified QMF subband signals.

3. A method for generating a high frequency component of a signal from a low frequency component of the signal, the method comprising:

providing a set of analysis subband signals from the low frequency component of the signal; wherein the set of analysis subband signals comprises at least two analysis subband signals;

determining a set of synthesis subband signals from the set of analysis subband signals, such that an $n^{th}$ synthesis subband signal of the set of synthesis subband signals is determined from a $k^{th}$ analysis subband signal and a $(k+1)^{th}$ analysis subband signal of the set of analysis subband signals; wherein a magnitude of the $n^{th}$ synthesis subband signal is determined from a product of an exponentiated magnitude of the $k^{th}$ analysis subband signal and an exponentiated magnitude of the $(k+1)^{th}$ analysis subband signal; wherein a sum of an exponent of the exponentiated magnitude of the $k^{th}$ analysis subband signal and an exponent of the exponentiated magnitude of the $(k+1)^{th}$ analysis subband signal equals one; wherein a phase of the $n^{th}$ synthesis subband signal depends on a transposition order T; and generating the high frequency component of the signal based on the set of synthesis subband signals.

4. The method of claim 3, wherein the set of analysis subband signals is generated from the low frequency component using an analysis filter bank; and the high frequency component is generated from the set of synthesis subband signals using a synthesis filter bank.

5. A non-transitory computer readable storage medium comprising a sequence of instructions, wherein, when executed by an audio signal processing device, the sequence of instructions causes the device to perform a method for generating a high frequency component of a signal from a low frequency component of the signal, the method comprising:

providing a set of analysis subband signals from the low frequency component of the signal; wherein the set of analysis subband signals comprises at least two analysis subband signals;

determining a set of synthesis subband signals from the set of analysis subband signals, such that an $n^{th}$ synthesis subband signal of the set of synthesis subband signals is determined from a $k^{th}$ analysis subband signal and a $(k+1)^{th}$ analysis subband signal of the set of analysis subband signals; wherein a magnitude of the $n^{th}$ synthesis subband signal is determined from a product of an exponentiated magnitude of the $k^{th}$ analysis subband signal and an exponentiated magnitude of the $(k+1)^{th}$ analysis subband signal; wherein a sum of an exponent of the exponentiated magnitude of the $k^{th}$ analysis subband signal and an exponent of the exponentiated magnitude of the $(k+1)^{th}$ analysis subband signal equals one; wherein a phase of the $n^{th}$ synthesis subband signal depends on a transposition order T; and generating the high frequency component of the signal based on the set of synthesis subband signals.

* * * * *